United States Patent
Thomas et al.

(10) Patent No.: US 11,300,045 B2
(45) Date of Patent: Apr. 12, 2022

(54) SYSTEMS AND METHODS FOR AN ELECTRICALLY DRIVEN DIRECT INJECTION FUEL PUMP

(71) Applicant: Ford Global Technologies, LLC, Dearborn, MI (US)

(72) Inventors: Joseph Lyle Thomas, Farmington Hills, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/516,151

(22) Filed: Jul. 18, 2019

(65) Prior Publication Data

US 2021/0017903 A1   Jan. 21, 2021

(51) Int. Cl.
| | |
|---|---|
| F02B 67/06 | (2006.01) |
| F02B 67/08 | (2006.01) |
| F02D 7/00 | (2006.01) |
| F02B 61/06 | (2006.01) |
| F02D 29/02 | (2006.01) |
| B60Q 5/00 | (2006.01) |

(52) U.S. Cl.
CPC .............. *F02B 67/08* (2013.01); *B60Q 5/008* (2013.01); *F02B 61/06* (2013.01); *F02D 7/00* (2013.01); *F02D 29/02* (2013.01)

(58) Field of Classification Search
CPC ............ F02B 67/08; F02B 61/06; F02D 7/00; B60W 10/30; B60W 10/26
See application file for complete search history.

(56) References Cited

U.S. PATENT DOCUMENTS

| | | | |
|---|---|---|---|
| 6,253,737 B1 | 7/2001 | Radue | |
| 8,001,942 B2 | 8/2011 | Ma et al. | |
| 2009/0247353 A1* | 10/2009 | Tryon | F16H 61/0031 477/20 |
| 2010/0293919 A1* | 11/2010 | Poisson | F02C 7/236 60/39.281 |
| 2013/0298875 A1* | 11/2013 | Nack | B60W 20/00 123/478 |
| 2015/0267628 A1* | 9/2015 | Bohn | B60Q 3/20 701/112 |
| 2019/0256079 A1* | 8/2019 | Lacroix | B60K 6/28 |

* cited by examiner

*Primary Examiner* — Syed O Hasan
(74) *Attorney, Agent, or Firm* — Geoffrey Brumbaugh; McCoy Russell LLP

(57) ABSTRACT

Methods and systems are provided for operating an electric motor to drive either a transmission fluid pump or a direct injection fuel pump. In one example, a method may include operating an electric motor to drive a direct injection fuel pump to supply fuel to a direct injection fuel rail while an engine of a start/stop vehicle is on, and operating the electric motor to drive an auxiliary transmission fluid pump to circulate transmission fluid to a transmission rotationally coupled to the engine while the engine is off during an auto-stop. In this way, the direct injection fuel pump may be electrically driven without increasing vehicle costs through adding an additional electric motor.

20 Claims, 6 Drawing Sheets

SYSTEMS AND METHODS FOR AN ELECTRICALLY DRIVEN DIRECT INJECTION FUEL PUMP

FIELD

The present description relates generally to methods and systems for controlling a direct injection fuel pump and an auxiliary transmission fluid pump.

BACKGROUND/SUMMARY

Some vehicle engine systems employ a fuel delivery system including multiple fuel pumps for providing suitable fuel pressure to fuel injectors for direct in-cylinder injection of fuel in what is known as gasoline direct injection (GDI). GDI is used to increase a power efficiency and range over which the fuel can be delivered to the cylinder. GDI fuel injectors may inject high pressure fuel to create enhanced atomization for more efficient combustion. As one example, a GDI system may include a lower pressure fuel lift pump and a higher pressure direct injection pump arranged in series between the fuel tank and the fuel injectors along a fuel passage. In many GDI applications, the fuel lift pump is electrically driven and supplies fuel from the fuel tank to the direct injection pump. Typically, the direct injection pump is mechanically driven and pressurizes a direct injection fuel rail that supplies fuel to the GDI fuel injectors. For example, the direct injection pump may be a piston (e.g., plunger) pump driven by a crankshaft or camshaft of the engine and may include a solenoid-actuated inlet valve or fuel volume regulator (FVR) that may be actuated to control fuel flow into the direct injection pump.

However, because the direct injection pump is mechanically driven by the engine, engine rotation is used to pressurize the direct injection fuel rail. Therefore, the direct injection fuel rail may not be pressurized when the engine speed is low or zero. This may result in long start times and prevent combustion-assisted starts. Additionally, torque disturbances may affect control of the inlet valve, as the inlet valve control may be synchronized with engine crankshaft position.

Other attempts to address the issues associated with mechanically driving the direct injection pump include electrifying the direct injection pump. One example approach is shown by Radue et al. in U.S. Pat. No. 6,253,737 B1. Therein, a fuel pump is driven by a linear electric motor to pressurize a direct injection fuel rail.

However, the inventors herein have recognized potential issues with such systems. As one example, including a dedicated electric motor to drive the direct injection pump increases vehicle costs. As another example, the inventors herein have advantageously recognized that some vehicles, such as start-stop vehicles, already include an electric motor for driving an auxiliary transmission fluid pump to provide hydraulic fluid pressure in an automatic transmission when the engine is shut down but the vehicle remains on (e.g., during an auto-stop). As such, conditions for driving the auxiliary transmission fluid pump may not overlap with conditions for driving the direct injection pump, which is used when the engine is on and not while the engine is off. Further, the auxiliary transmission pump electric motor is of an appropriate size for providing an amount of hydraulic power used by the GDI system.

In one example, the issues described above may be addressed by a method, comprising: during an engine-on condition of an engine of a vehicle, operating an electric motor to drive a direct injection fuel pump to supply fuel to a direct injection fuel rail; and during an engine-off condition of the engine while the vehicle remains on, operating the electric motor to drive an auxiliary transmission fluid pump to circulate transmission fluid to a transmission rotationally coupled to the engine. In this way, the direct injection fuel pump may be electrified without adding an additional electric motor to the vehicle.

As one example, the auxiliary transmission fluid pump may be deactivated during the engine-on condition and activated during the engine-off condition. This may include, for example, maintaining a solenoid-actuated bypass valve coupled to an inlet of the auxiliary transmission fluid pump de-energized during the engine-on condition and energized during the engine-off condition. For example, the solenoid-actuated bypass valve may enable flow through a bypass passage that couples an outlet of the auxiliary transmission fluid pump to an inlet of the auxiliary transmission fluid pump when de-energized and blocks flow through the bypass passage when energized. As another example, the direct injection fuel pump may be activated during the engine-on condition and deactivated during the engine-off condition. This may include, for example, energizing an inlet solenoid valve coupled to an inlet of the direct injection fuel pump during the engine-on condition and maintaining the inlet solenoid valve de-energized during the engine-off condition. The inlet solenoid valve may hold open an inlet check valve of the direct injection fuel pump when the inlet solenoid valve is de-energized, allowing fuel to flow in and out of the direct injection fuel pump without becoming pressurized, thereby deactivating the direct injection fuel pump. As still another example, the method may further include restarting the engine responsive to the fuel rail pressure decreasing to a threshold pressure during the engine-off condition. In this way, a combustion-assisted start may be performed without operating the direct injection fuel pump with a dedicated electric motor. Further, the inlet solenoid valve may be controlled independently of the engine speed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3A:
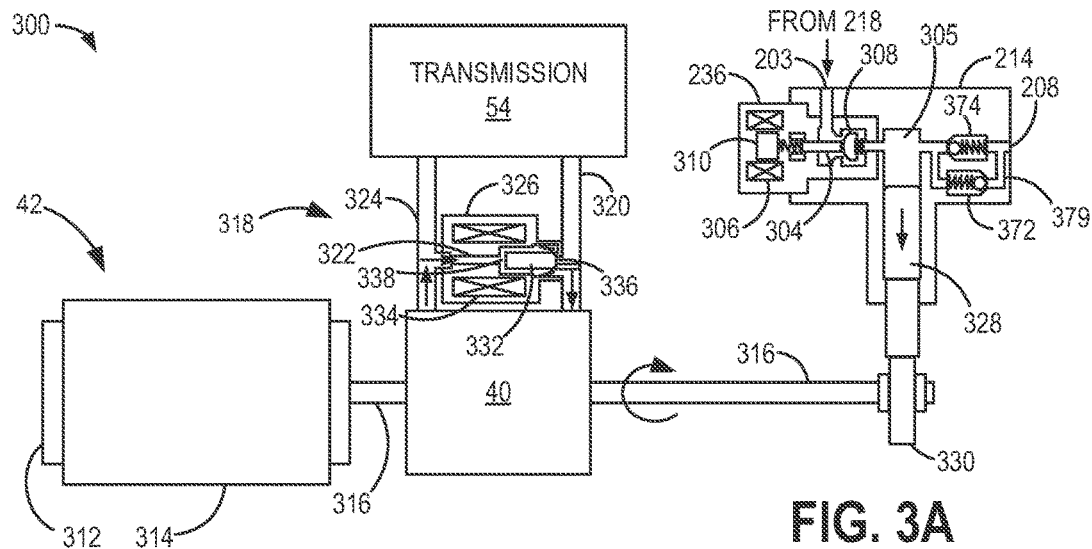
FIGS. 3A-3C show a first example configuration of a direct injection fuel pump and an auxiliary transmission fluid pump sharing a common pump motor.
Figure 3B:
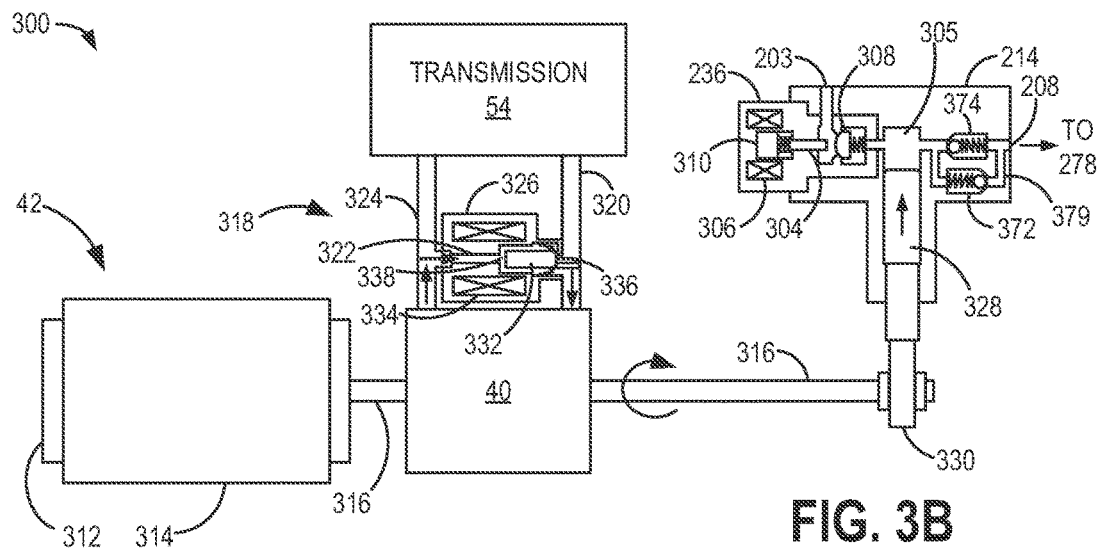
Figure 3C:
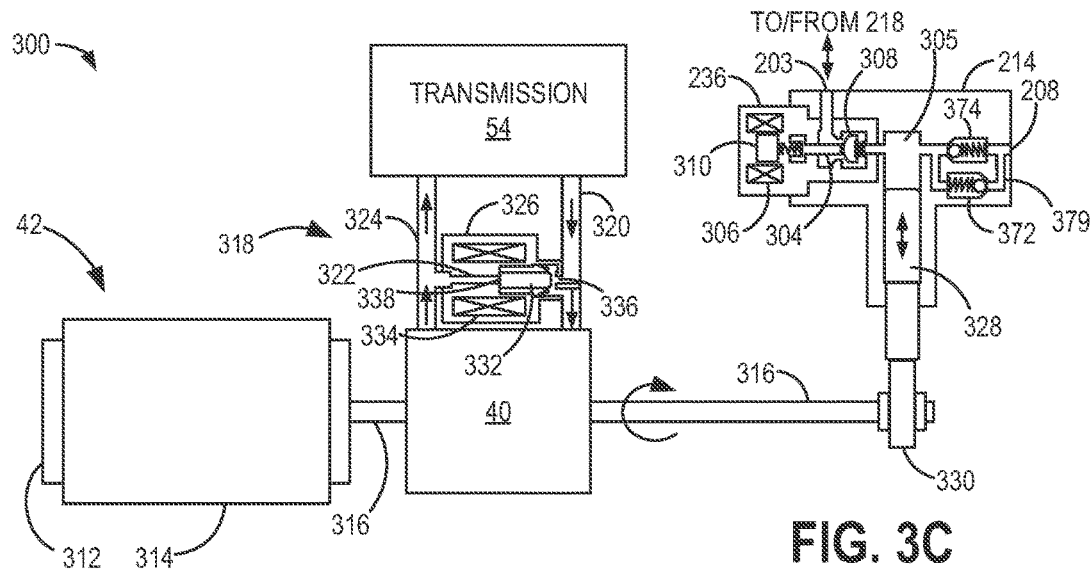
Figure 4A:
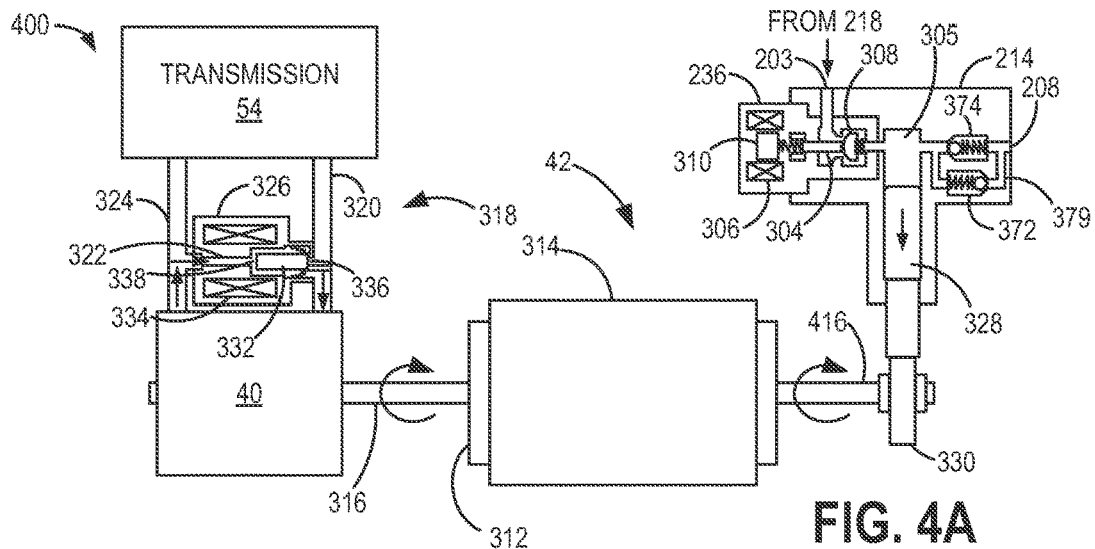
FIGS. 4A-4C show a second example configuration of a direct injection fuel pump and an auxiliary transmission fluid pump sharing a common pump motor.
Figure 4B:
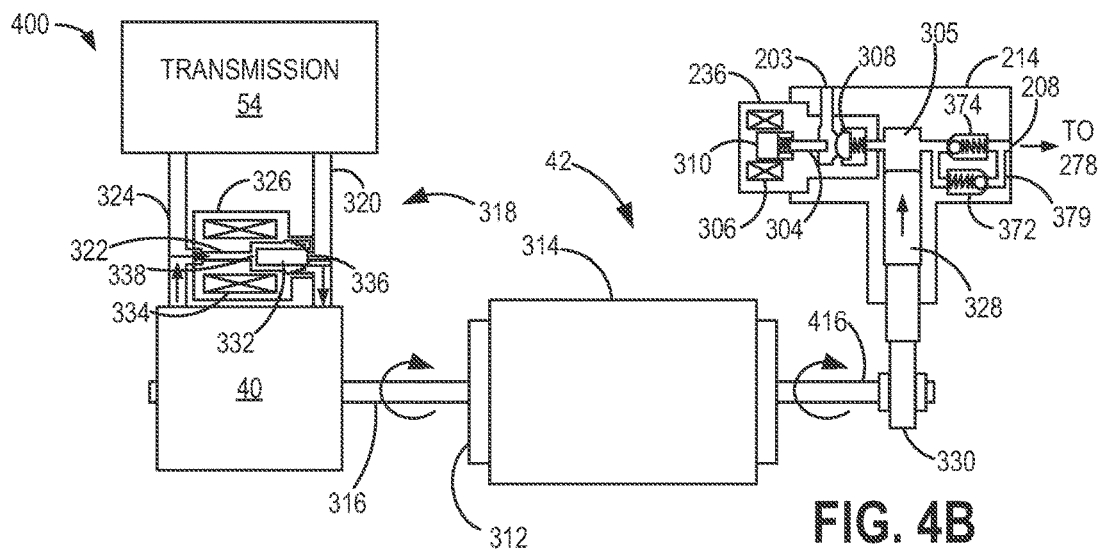
Figure 4C:
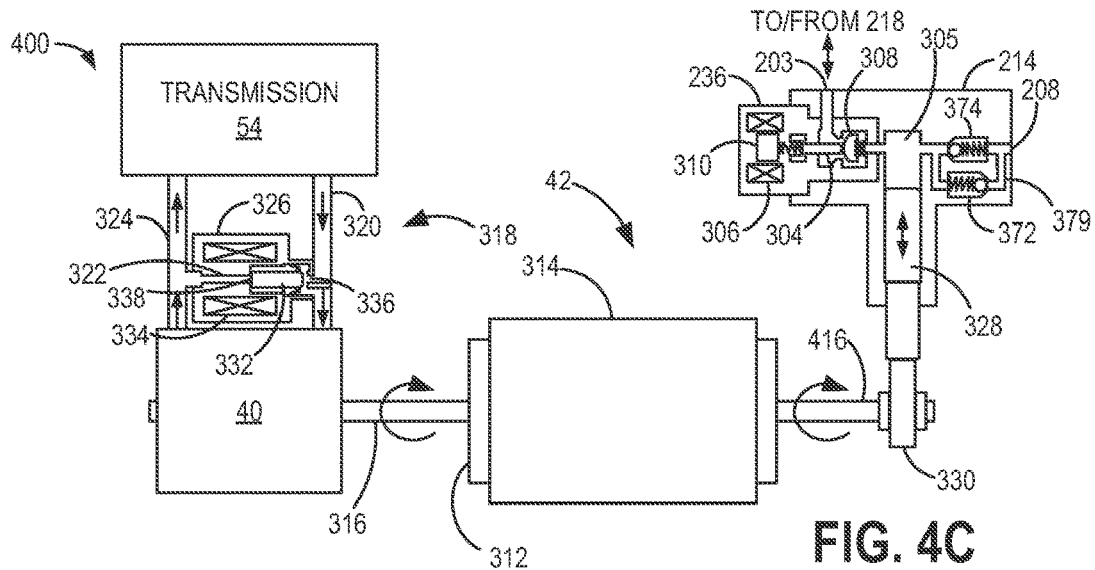
Figure 5:
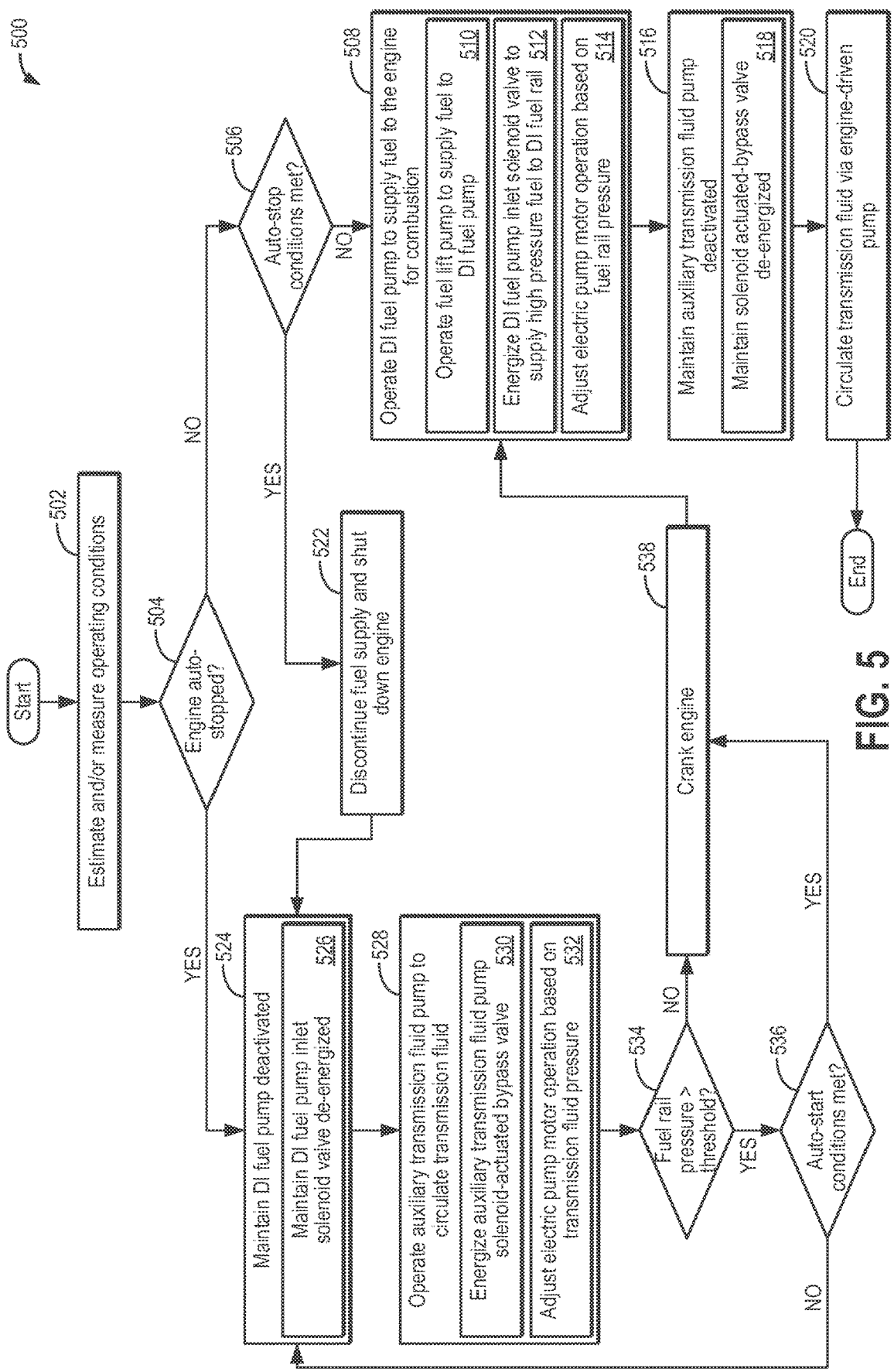
FIG. 5 shows an example method for operating a pump motor for driving a direct injection fuel pump and an auxiliary transmission fluid pump in a start-stop vehicle.
Figure 6:
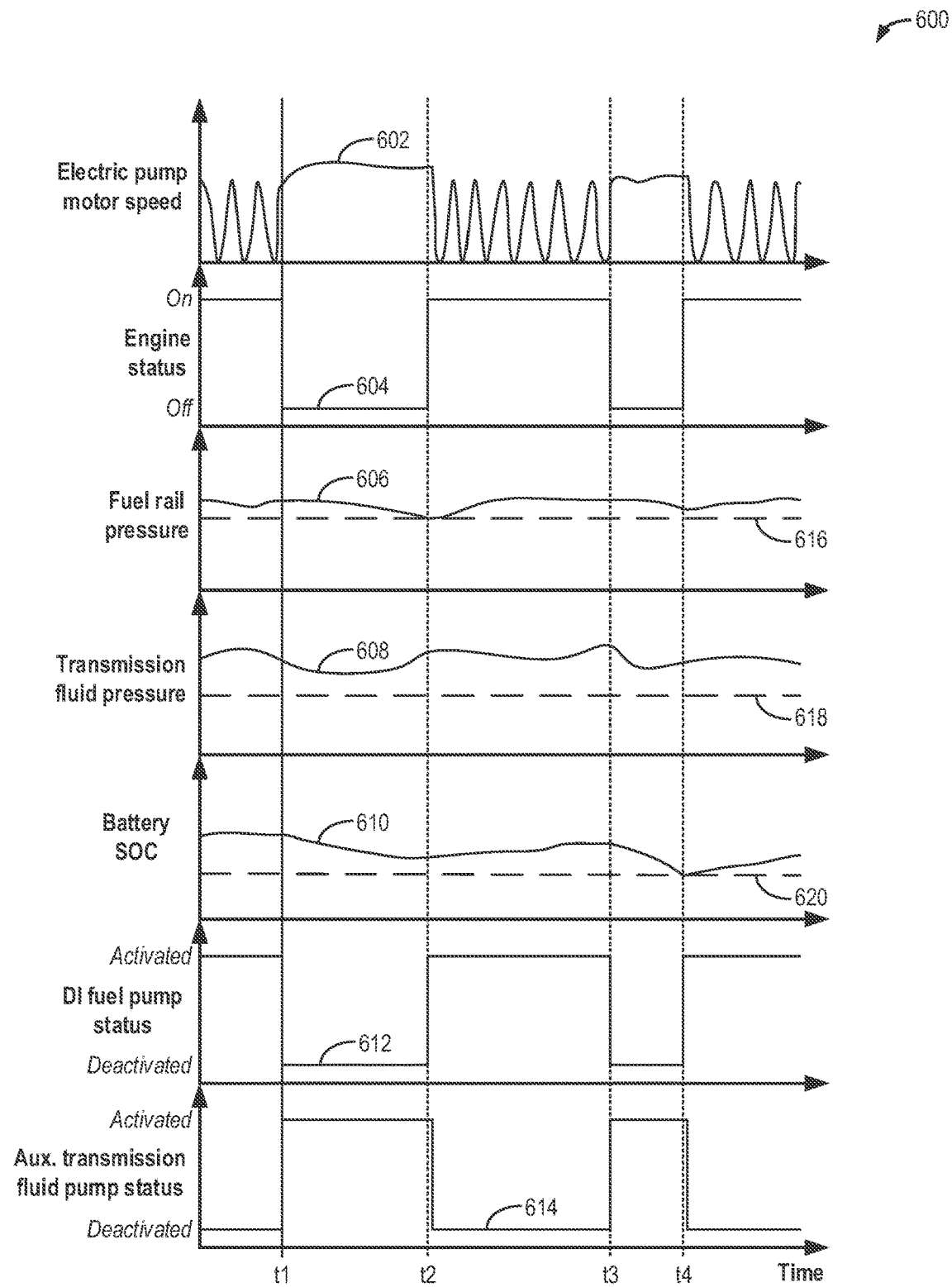
FIG. 6 depicts a prophetic example timeline for adjusting operation of a direct injection fuel pump, an auxiliary transmission fluid pump, and a common pump motor shared by the direct injection fuel pump and the auxiliary transmission fluid pump based on engine operating conditions.

The following description relates to systems and methods for controlling a direct injection fuel pump and an auxiliary transmission fluid pump that are driven by a same electric motor. For example, the direct injection fuel pump may be used to provide high pressure fuel for direct injection in an engine cylinder, such as the cylinder depicted in FIG. 1, and may be included in the example fuel system shown in FIG. 2. FIGS. 3A-3C and FIGS. 4A-4C show example configurations of the direct injection fuel pump and the auxiliary transmission fluid pump coupled to the electric motor. In particular, FIGS. 3A-3C and FIGS. 4A-4C demonstrate how the direct injection fuel pump and the auxiliary transmission fluid pump may be activated and deactivated via corresponding solenoid-actuated valves so that the electric motor drives either the direct injection fuel pump or the auxiliary transmission fluid pump (e.g., based on whether the engine is on or off) while the other pump is freewheeled. An example method for selecting between operating the direct injection fuel pump and operating the auxiliary transmission fluid pump based on an engine operating status, and adjusting the electric motor operation accordingly, is shown in FIG. 5. FIG. 6 shows an example timeline of switching the direct injection fuel pump between an activated and a deactivated state and switching the auxiliary transmission pump between the deactivated and activated state responsive to an engine auto-stop.

Figure 1:
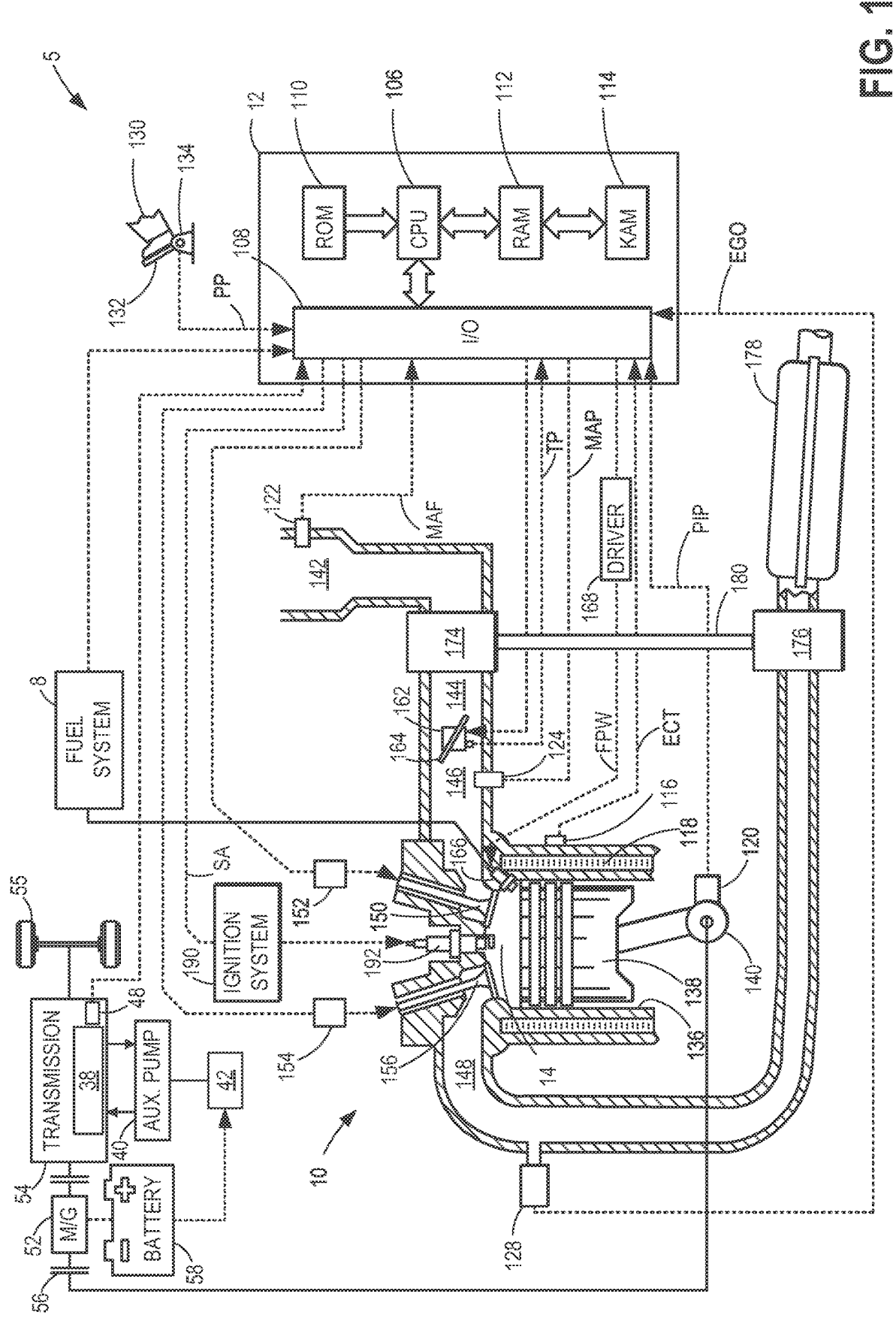
FIG. 1 schematically depicts an example cylinder of an internal combustion engine.

Turning now to the figures, FIG. 1 depicts an example configuration of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

In the depicted example, transmission 54 includes an engine-driven transmission fluid pump 38 that is configured to circulate transmission fluid through an engine-driven pump fluid loop, thereby providing hydraulic pressure to engage various transmission clutches. Engine-driven fluid pump 38 may be driven by the rotation of the engine or a transmission input shaft, for example. Thus, engine-driven transmission fluid pump 38 may operate during engine running conditions and not during engine-off conditions. Furthermore, the hydraulic pressure generated in engine-driven transmission fluid pump 38 may increase as an engine speed increases and decrease as the engine speed decreases. Additionally, a pressure of the transmission fluid may be measured by a transmission fluid pressure sensor 48 and transmitted to controller 12.

Vehicle 5 may be equipped with a start-stop system, wherein engine 10 is selectively shut down by controller 12 responsive to engine auto-stop conditions (and without receiving a shutdown request from an operator) and then restarted by controller 12 responsive to engine auto-start (e.g., restart) conditions (and without receiving a restart request from the operator). Therefore, transmission 54 is equipped with an auxiliary transmission fluid pump 40. As such, auxiliary transmission fluid pump 40 may be configured to pump transmission fluid through transmission components during conditions when the engine-driven transmission fluid pump 38 is not operating (such as when the vehicle is on and the engine is not running), thereby maintaining hydraulic pressure in various clutches to enable expedited engagement of the various clutches in response to a controller request for clutch modulation. Auxiliary transmission fluid pump 40 may be configured to circulate transmission fluid through an auxiliary fluid loop and may be driven by an electric pump motor 42 that receives electrical power from system battery 58. As will be described below with respect to FIGS. 3A-3C and 4A-4C, electric pump motor 42 may also be configured to drive a high pressure fuel pump.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine, and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at or near maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including one fuel injector 166. Fuel injector 166 may be configured to deliver fuel received from a fuel system 8. As elaborated below with reference to FIG. 2, fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter referred to as "DI") of fuel into cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump and a fuel rail, as will be described below with respect to FIG. 2. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

It will be appreciated that in an alternative embodiment, the engine may alternatively be operated by injecting fuel via multiple injectors, such as one direct injector and one port injector. The port injector may provide fuel into the intake port upstream of cylinder 14. In such a configuration, the controller may vary a relative amount of injection from each injector. Further, while the example embodiment shows fuel injected to the cylinder via a single injector, in some examples, cylinder 14 may have more than one fuel injector 166 coupled thereto.

Fuel may be delivered by fuel injector 166 to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving signals from the various sensors, controller 12 may automatically shut down the engine for an auto-stop, as further described below with respect to FIG. 5. During the auto-stop, electric pump motor 42 may be used to operate auxiliary transmission fluid pump 40. Then, based on signals received from the various sensors during the auto-stop, controller 12 may automatically restart the engine, and electric pump motor 42 instead may be used to operate a direct injection fuel pump while transmission fluid pressure is provided via engine-driven transmission fluid pump 38.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
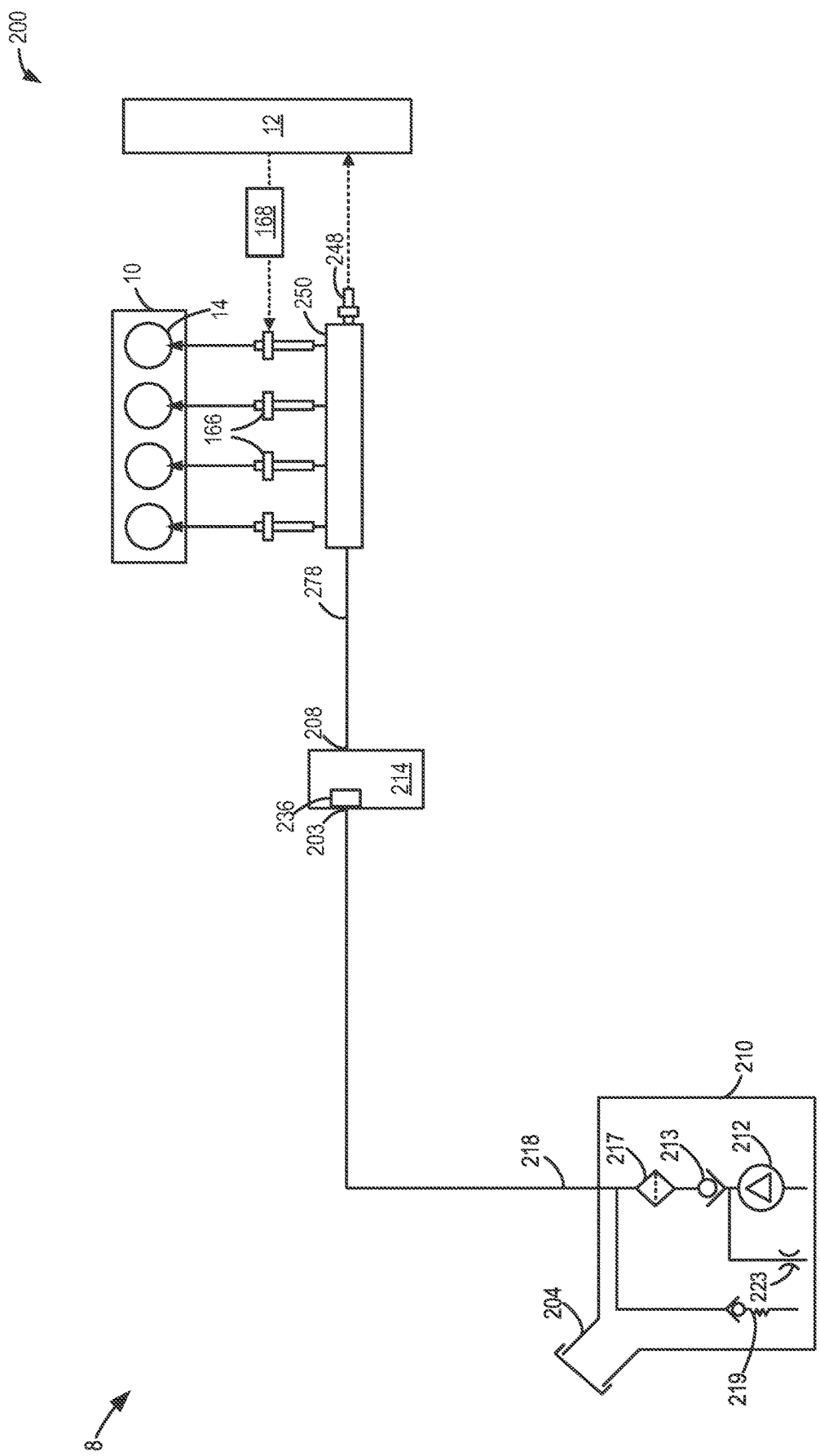
FIG. 2 schematically depicts an example of a fuel system that may be used with the engine of FIG. 1.

Next. FIG. 2 schematically depicts an example configuration 200 of fuel system 8 introduced in FIG. 1, which may be operated to deliver high pressure fuel to an engine, such as engine 10, having a plurality of cylinders 14. As such, components of FIG. 2 that have been previously introduced in FIG. 1 are numbered the same and may not be reintroduced. It is noted here that components shown in FIG. 2 may be removed and/or changed while additional components not presently shown may be added to fuel system 8 while still maintaining the ability to deliver high pressure fuel to a direct injection fuel rail.

Fuel system 8 includes a fuel storage tank 210 for storing the fuel on-board the vehicle, a low pressure fuel pump (LPP) 212 (also referred to as a lift pump or a fuel lift pump herein), and a high pressure fuel pump (HPP) 214 (also referred to as a direct injection pump or a direct injection fuel pump herein). Fuel may be provided to fuel tank 210 via a fuel filling passage 204. In one example, LPP 212 may be an electrically-powered, lower pressure fuel pump disposed at least partially within fuel tank 210. LPP 212 may be operated by controller 12 to provide fuel to HPP 214 via a low pressure fuel passage 218. As one example, LPP 212 may be a turbine (e.g., centrifugal) pump including an electric (e.g., DC) pump motor, whereby a pressure increase across the pump and/or a volumetric flow rate through the pump may be controlled by varying an amount of electrical power provided to the pump motor, thereby increasing or decreasing the motor speed. For example, as the controller reduces the electrical power provided to LPP 212, the volumetric flow rate and/or pressure increase across the lift pump may be reduced. Conversely, the volumetric flow rate and/or pressure increase across the lift pump may be increased by increasing the electrical power provided to LPP 212. As one example, the electrical power supplied to the lift pump motor can be obtained from an alternator or other energy storage device on-board the vehicle, such as system battery 58 shown in FIG. 1, whereby controller 12 can control the electrical load that is used to power LPP 212. Thus, by varying the voltage and/or current provided to LPP 212, the flow rate and pressure of the fuel provided at the inlet of HPP 214 is adjusted, as further described below. Note that in other examples, a dedicated fuel controller that is communicatively coupled to controller 12 may be used to control one or more of LPP 212, HPP 214, and electronic driver 168.

LPP 212 may be fluidly coupled to a filter 217, which may remove small impurities contained in the fuel to prevent fuel system degradation. A check valve 213, which may facilitate fuel delivery and maintain fuel line pressure, may be positioned fluidly upstream of filter 217. With check valve 213 upstream of filter 217, a compliance of low pressure fuel passage 218 may be increased because the filter may be physically large in volume. Furthermore, a pressure relief valve 219 may be employed to limit the fuel pressure in low pressure fuel passage 218 (e.g., the output of LPP 212). Pressure relief valve 219 may include a ball and spring mechanism that seats and seals at a specified pressure differential, for example. The pressure differential setpoint at which pressure relief valve 219 is configured to open may be in a range of 5 bar to 6.4 bar, as a non-limiting example. An orifice 223 may be utilized to allow for air and/or fuel vapor to bleed out of the lift pump 212. The bleed at orifice 223 may also be used to power a jet pump used to transfer fuel from one location to another within fuel storage tank 210. In one example, an orifice check valve (not shown) may be placed in series with orifice 223. Furthermore, in some examples, configuration 200 may include one or more (e.g., a series) of check valves fluidly coupled to LPP 212 to impede fuel from leaking back upstream of the valves.

Fuel lifted by LPP 212 may be supplied at a lower pressure into low pressure fuel passage 218 leading to an inlet 203 of HPP 214. HPP 214 is coupled downstream of LPP 212 with no additional pump positioned in between. HPP 214 may deliver fuel received from LPP 212 to a direct injection (DI) fuel rail 250 coupled to one or more direct fuel injectors 166. As shown, DI fuel rail 250 is coupled to an outlet 208 of HPP 214 along a fuel passage 278. HPP 214 may be operated to raise the pressure of fuel delivered to DI fuel rail 250 above the lift pump pressure such that DI fuel rail 250 may be operated at a variable high pressure (such as in a range from 15 to 200 bar, for example). As elaborated herein with respect to FIGS. 3A-3C and 4A-4C, HPP 214 may be a piston (or plunger) pump driven by an electric motor that also drives an auxiliary transmission fluid pump (e.g., electric pump motor 42 introduced in FIG. 1).

DI fuel rail 250 includes a fuel rail pressure sensor 248 for providing an indication of the direct injection fuel rail pressure to controller 12 and dispenses fuel to the fuel injectors 166. While four fuel injectors 166 (and four cylinders 14) are shown, any suitable number of fuel injectors 166 may be included. Controller 12 can individually actuate each of the fuel injectors 166 via electronic driver 168 to directly inject fuel into each cylinder 14 at an appropriate time in its cycle. Controller 12, electronic driver 168, and any other suitable engine system controllers may comprise a fuel control system, for example. While electronic driver 168 is shown external to controller 12, it should be appreciated that in other examples, the controller 12 may include electronic driver 168 within a housing of the controller, or controller 12 may be configured to provide the functionality of electronic driver 168.

Controller 12 can also control the operation of each of LPP 212 and HPP 214 to adjust an amount, pressure, flow rate, etc. of fuel delivered to the engine. As one example, controller 12 can vary a pressure setting, a pump stroke amount, a pump duty cycle command, and/or a fuel flow rate of each of the fuel pumps to deliver fuel to different locations of the fuel system. A driver (not shown) electronically coupled to controller 12 may be used to send a control signal to LPP 212, as required, to adjust the output of LPP 212. As an example, controller 12 may be configured to regulate a pressure of fuel at inlet 203 by adjusting an output of LPP 212. Further, controller 12 may be configured to regulate fuel flow into HPP 214 through an inlet solenoid valve 236, as will be further described below with respect to FIGS. 3A-3C and 4A-4C.

As mentioned above, LPP 212 may be used for supplying fuel to HPP 214. In some examples, LPP 212 may be operated in a pulsed mode, where LPP 212 is alternately switched on and off based on fuel pressure readings from pressure sensor 248 coupled to DI fuel rail 250, thereby reducing power consumption by LPP 212. In other examples, in the pulsed mode, LPP 212 may be activated (as in, turned on) but may be set at zero voltage. As such, this setting for LPP 212 may effectively ensure lower energy consumption by LPP 212 while providing a faster response time when LPP 212 is actuated. When low pressure pump operation is desired, voltage supplied to LPP 212 may be increased from zero voltage to enable pump operation. Thus, LPP 212 may be pulsed from a zero voltage to a non-zero voltage. In one example, LPP 212 may be pulsed from zero voltage to full voltage. In another example, LPP 212 may be pulsed for short intervals, such as 50 to 250 milliseconds, at a non-zero voltage. The non-zero voltage may be determined based on a duration of the pulse and the interval between each pulse. In still another example, LPP 212 may be operated in a continuous mode, with the amount of non-zero voltage supplied to LPP 212 varied to provide a lowest pressure at inlet 203 of HPP 214 without volumetric efficiency loss.

As mentioned above, auxiliary transmission fluid pump 40 of FIG. 1 and HPP 214 of FIG. 2 each may be driven by electric pump motor 42 introduced in FIG. 1. Therefore, FIGS. 3A-3C provide a first example configuration 300 of an electrically driven fuel and transmission fluid pump system, and FIGS. 4A-4C provide a second example configuration 400 of the electrically driven fuel and transmission pump system. FIGS. 3A-3C and 4A-4C will be described collectively, with like components numbered the same. Further, components of FIGS. 3A-3C and 4A-4C previously introduced in FIGS. 1 and 2 are numbered the same and may not be reintroduced.

Electric pump motor 42 includes a rotor 312, a stator 314, and at least one shaft 316 coupled to rotor 312. Stator 314 is a stationary component of electric pump motor 42 and may include permanent magnets, for example. Rotor 312 may include windings that form magnetic poles when energized with electric current (such as drawn from system battery 58 of FIG. 1, for example), causing rotor 312 to interact with the permanent magnets of stator 314. The interaction of the current-induced magnetic poles of rotor 312 and the permanent magnets of stator 314 produces forces that cause rotor 312 to rotate within stator 314, which turns shaft 316 to deliver mechanical power to the pumps coupled thereto.

First example configuration 300 of FIGS. 3A-3C shows electric pump motor 42 having a single shaft 316, with auxiliary transmission fluid pump 40 and HPP 214 both mechanically coupled thereto. In contrast, second example configuration 400 of FIGS. 4A-4C shows electric pump motor 42 having a second shaft 416 in addition to shaft 316. For example, shaft 316 may be coupled to rotor 312 on a first motor end, and shaft 416 may be coupled to rotor 312 on a second motor end. In second example configuration 400, auxiliary transmission fluid pump 40 is coupled to shaft 316, and HPP 214 is coupled to shaft 416. However, it should be understood that because shaft 316 and shaft 416 are each coupled to rotor 312, the rotation of rotor 312 results in the rotation of both shaft 316 and shaft 416. In particular, by including two electric motor shafts, there may be greater packaging flexibility of electric pump motor 42, auxiliary transmission fluid pump 40, and HPP 214.

Auxiliary transmission fluid pump 40 may be a gear rotor pump (e.g., a gerotor), including an inner rotor and an outer gear ring. Shaft 316 may pass through and engage with the inner rotor such that rotation of shaft 316 results in the rotation of the inner rotor. As will be elaborated below, when auxiliary transmission fluid pump 40 is activated, rotation of the inner rotor results in transmission fluid being pumped through an auxiliary transmission fluid loop 318. In contrast, when auxiliary transmission fluid pump 40 is deactivated, the inner rotor may rotate without appreciably pumping transmission fluid (e.g., auxiliary transmission fluid pump 40 is "freewheeled").

HPP 214 includes a pump compression chamber 305 and pump piston 328 constrained to move linearly therein to intake (e.g., suction), compress, and eject fuel. Pump piston 328 receives mechanical input from shaft 316 (in first example configuration 300) or shaft 416 (in second example configuration 400) via a cam 330. For example, rotation of the electric pump motor shaft causes pump piston 328 to reciprocate up and down within pump compression chamber 305 based on a shape (e.g., cam profile) of cam 330. HPP 214 is in a suction stroke when pump piston 328 is traveling in a direction that increases the volume of pump compression chamber 305, as shown in FIGS. 3A and 4A, and is in a compression stroke when pump piston 328 is traveling in a direction that reduces the volume of pump compression chamber 305, as shown in FIGS. 3B and 4B. As will be elaborated below, when HPP 214 is activated, inlet solenoid valve 236 (which may be a fuel volume regulator, a magnetic solenoid valve, etc.) may be used to vary an effective pump volume of each pump stroke, at least in some examples. Inlet solenoid valve 236 may also be used to deactivate HPP 214 such that pump piston 328 may continue to reciprocate without increasing fuel pressure, as will be elaborated with respect to FIGS. 3C and 4C.

Auxiliary transmission fluid loop 318 includes an inlet passage 320 coupled to an inlet of auxiliary transmission fluid pump 40, an outlet passage 324 coupled to an outlet of auxiliary fluid pump 40, and a pump bypass passage 322 coupled between outlet passage 324 and inlet passage 320. Further, a solenoid-actuated bypass valve 326 is positioned in pump bypass passage 322. Solenoid-actuated bypass valve 326 may be a 3/2 solenoid-actuated valve that, when de-energized, blocks flow from transmission 54 to the inlet of auxiliary transmission fluid pump 40 via inlet passage 320 and enables flow through pump bypass passage 322. When energized, solenoid-actuated bypass valve 326 may block flow through pump bypass passage 322 and enable flow from transmission 54 to the inlet of auxiliary transmission fluid pump 40 via inlet passage 320.

For example, solenoid-actuated bypass valve 326 is shown including a plunger 332 and solenoids 334 that may be electrically energized by a controller (e.g., controller 12 of FIGS. 1-2) to actuate movement of plunger 332. Plunger 332 is movable between a first opening 336 and a second opening 338. First opening 336 provides a first flow passage through solenoid-actuated bypass valve 326 to fluidically couple a first, transmission-side portion of inlet passage 320, upstream of solenoid-actuated bypass valve 326, to a second, auxiliary transmission fluid pump-side portion of inlet passage 320, downstream of solenoid-actuated bypass valve 326. Second opening 338 provides a second flow passage through solenoid-actuated bypass valve 326 to fluidically couple outlet passage 324 to the second, auxiliary transmission fluid pump-side portion of inlet passage 320 via pump bypass passage 322.

When solenoids 334 are de-energized, a return spring holds plunger 332 against first opening 336, sealing first opening 336. While plunger 332 is held against first opening 336 by the return spring, second opening 338 is open. Thus, when solenoid-actuated bypass valve 326 is de-energized, the first flow passage is closed, and the second flow passage is open. As such, transmission fluid may flow from outlet passage 324 to the second portion of inlet passage 320 via bypass passage 322, bypassing transmission 54. In this way, auxiliary transmission fluid pump 40 may not perform appreciable pumping work on the transmission fluid when solenoid-actuated bypass valve 326 is de-energized, and auxiliary transmission fluid pump 40 may be considered deactivated. For example, as the inner rotor of auxiliary transmission fluid pump 40 is rotated by shaft 316 of electric pump motor 42, transmission fluid may be re-circulated between the inlet of auxiliary transmission fluid pump 40 and the outlet of auxiliary transmission fluid pump 40 via bypass passage 322 and the de-energized solenoid-actuated bypass valve 326. Auxiliary transmission fluid pump 40 is shown in the deactivated state in FIGS. 3A, 3B, 4A, and 4B.

In contrast, when solenoids 334 are energized, plunger 332 is drawn toward solenoids 334, overcoming a spring force of the return spring, until it makes contact with second opening 338. This closes (e.g., seals) second opening 338. While plunger 332 is held against second opening 338 by the energized solenoids 334, first opening 336 is open. Thus, the first flow passage is open, and the second flow passage is closed. As such, transmission fluid may flow from transmission 54 to auxiliary transmission fluid pump 40 when solenoid-actuated bypass valve 326 is energized, and auxiliary transmission fluid pump 40 may be considered activated. Auxiliary transmission fluid pump 40 is shown in the activated state in FIGS. 3C and 4C. For example, transmission fluid may be drawn into auxiliary transmission fluid pump 40 from transmission 54 via inlet passage 320 due to rotation of the inner rotor by shaft 316 of electric pump motor 42. The transmission fluid may be pressurized within pump chambers formed between the inner rotor and the outer gear ring and circulated back to transmission 54 via outlet passage 324.

As mentioned above with respect to FIG. 2, fuel may be provided to inlet 203 of HPP 214 from low pressure fuel passage 218. Fuel flow through HPP 214, and also HPP 214 activation and deactivation, may be controlled by energizing and de-energizing inlet solenoid valve 236. Inlet solenoid valve 236 includes a plunger 304, solenoids 306, an inlet check valve 308, and a plate 310. When solenoids 306 of inlet solenoid valve 236 are de-energized, a spring bias pushes plunger 304 away from plate 310 and into inlet check valve 308. This forces inlet check valve 308 open, enabling fuel to flow in either direction through inlet check valve 308. By energizing solenoids 306, plunger 304 may be drawn toward solenoids 306, overcoming a force of the spring bias, until plunger 304 contacts plate 310. With plunger 304 contacting plate 310, plunger 304 no longer contacts (and no longer forces open) inlet check valve 308. When not forced open by plunger 304, inlet check valve 308 is a forward flow, one-way valve, allowing fuel flow in one direction only. As a result, fuel may flow into pump compression chamber 305 from inlet 203 and may not flow from pump compression chamber 305 to inlet 203 when solenoids 306 are energized. For example, when solenoids 306 are energized, inlet check valve 308 enables fuel flow from inlet 203 to pump compression chamber 305 when the pressure within pump compression chamber 305 is less than the pressure of low pressure fuel passage 218, such as during a suction stroke of pump piston 328.

HPP 214 may additionally include an outlet check valve 374 and a pressure relief valve 372 positioned between pump compression chamber 305 and outlet 208. Pressure relief valve 372, arranged parallel to outlet check valve 374 in a bypass passage 379, may limit the pressure in fuel passage 278 downstream of HPP 214. In one non-limiting example, pressure relief valve 372 may limit the pressure in fuel passage 278 (and DI fuel rail 250 shown in FIG. 2) to 200 bar, thereby preventing over-pressurization of the fuel rail. Furthermore, outlet check valve 374 of HPP 214 is a forward flow, one-way valve that is mechanically controlled (and not electronically controlled by the controller, such as inlet solenoid valve 236). Outlet check valve 374 enables fuel to flow from pump compression chamber 305 to fuel passage 278 when the pressure within pump compression chamber 305 is greater than the pressure of fuel passage 278 and prevents fuel from flowing from fuel passage 278 to pump compression chamber 305. Thus, outlet check valve 374 may maintain fuel passage 278 (and DI fuel rail 250 of FIG. 2) at a high pressure.

When HPP 214 is activated and used to pump high pressure fuel to fuel passage 278, the controller (e.g., controller 12 of FIGS. 1-2) may energize solenoids 306 of inlet solenoid valve 236. In a first example, the controller may selectively energize solenoids 306 in synchronism with cam 330. For example, a sensor (not shown) may be positioned near cam 330 to enable a determination of an angular position of cam 330 (e.g., between 0 and 360 degrees), which may be relayed to the controller. The angular position of cam 330 may be used by the controller to determine the relative position of pump piston 328. For example, pump piston 328 may be at top dead center (TDC) when the volume of pump compression chamber 305 is the smallest, and pump piston 328 may be at bottom dead center (BDC) when the volume of pump compression chamber 305 is the largest.

Therefore, in the first example, solenoids 306 may be de-energized during the suction stroke, even while HPP 214 is activated, as illustrated in FIGS. 3A and 4A. Then, the controller may energize solenoids 306 when the piston reaches a desired position relative to TDC of the compression stroke (or when cam 330 is at a desired angular position) to close inlet check valve 308 and prevent fuel from spilling back to inlet 203, as shown in FIGS. 3B and 4B. As an example, an earlier inlet check valve 308 closing timing in the compression stroke may increase a volume of fuel compressed, whereas a later inlet check valve 308 closing timing may decrease the volume of fuel compressed. Thus, depending on the timing of the solenoid valve actuation, the volume transferred to fuel passage 278, and the resulting pressure in fuel passage 278, may be varied.

In a second example, the controller may maintain solenoids 306 energized while HPP 214 is activated. By maintaining solenoids 306 energized, inlet check valve 308 may open during the suction stroke to enable fuel to flow from inlet 203 to pump compression chamber 305 (e.g., when the pressure of inlet 203 is greater than the pressure of pump compression chamber 305) and close during the compression stroke to prevent fuel from spilling back to inlet 203 (e.g., when the pressure of pump compression chamber 305 is greater than the pressure of inlet 203). However, in the second example, the volume transferred to fuel passage 278 may not be controlled via the actuation timing of inlet solenoid valve 236.

In contrast, when HPP 214 is deactivated, solenoids 306 of inlet solenoid valve 236 may be maintained de-energized. As such, fuel may be drawn into pump compression chamber 305 when pump piston 328 moves toward BDC and may be pushed back out of pump compression chamber 305 through the held open inlet check valve 308 as pump piston 328 returns to TDC without compressing the fuel within pump compression chamber 305. Thus, pump piston 328 may continue to reciprocate without performing pumping work when HPP 214 is deactivated and auxiliary transmission fluid pump 40 is activated, as shown in FIGS. 3C and 4C.

While first example configuration 300 shows shaft 316 first passing through auxiliary transmission fluid pump 40 before passing through cam 330 of HPP 214, other configurations may be possible that include a same electric pump motor shaft (e.g., shaft 316) driving both auxiliary transmission fluid pump 40 and HPP 214. For example, shaft 316 may first pass through cam 330 before passing through auxiliary transmission fluid pump 40. Thus, the relative positioning of components along shaft 316 shown in configuration 300 is provided by way of example.

Further, FIGS. 3A-3C and 4A-4C show a same rotational direction of rotor 312 and the electric pump motor shaft(s) for operating auxiliary transmission fluid pump 40 and HPP 214. However, in other examples, auxiliary transmission fluid pump 40 may be operated via rotation of rotor 312 in a first direction (e.g., clockwise), and HPP 214 may be operated via rotation of rotor 312 in a second, opposite direction (e.g., counterclockwise). As one illustrative example with particular respect to FIGS. 4A-4C, configuration 400 may further include opposed one-way clutches on each pump drive. For example, shaft 316 may include a first one-way clutch that engages in a first rotational direction of rotor 312 and disengages in a second, opposite rotational direction of rotor 312. Shaft 416 may include a second one-way clutch that engages in the second rotational direction of rotor 312 and disengages in the first rotational direction of rotor 312. In this way, rotor 312 rotation in the first direction may activate auxiliary transmission fluid pump 40 (and deactivate HPP 214) to drive transmission fluid pumping, while rotor 312 rotation in the second direction may activate HPP 214 (and deactivate auxiliary transmission fluid pump 40) to drive high pressure fuel pumping. In some examples, the opposed one-way clutches may be included in place of solenoid-actuated bypass valve 326 and/or inlet solenoid valve 236, while in other examples, the opposed one-way clutches may be included in addition to one or more of solenoid-actuated bypass valve 326 and inlet solenoid valve 236. As an example, configuration 400 may include the first one-way clutch coupled to shaft 316, the second one-way clutch coupled to shaft 416, and inlet solenoid valve 236 for varying a pump stroke of HPP 214 while solenoid-actuated bypass valve 326 is not included.

Further still, it is noted here that HPP 214 is presented as an illustrative example of one possible configuration for a high pressure fuel pump. Components shown in FIGS. 3A-3C and 4A-4C may be removed and/or changed while additional components not presently shown may be added to HPP 214 while still maintaining the ability to deliver high pressure fuel to a direct injection fuel rail.

Thus, FIGS. 3A-3C and 4A-4C show two example configurations for an auxiliary transmission fluid pump (e.g., auxiliary transmission fluid pump 40) and a DI fuel pump (e.g., HPP 214) that are each mechanically coupled to a same electric pump motor (e.g., electric pump motor 42). In particular, activation and deactivation of the auxiliary transmission fluid pump may be controlled via actuation of a solenoid bypass valve, and activation and deactivation of the DI fuel pump may be controlled via actuation of an inlet solenoid valve. Additionally, operation of the electric pump motor may be adjusted based on whether it is used to pump fuel (via the DI fuel pump) or transmission fluid (via the auxiliary transmission fluid pump).

Next, FIG. 5 provides an example control method 500 for adjusting operation of the DI fuel pump, the auxiliary transmission fluid pump, and the common electric pump motor based on operating conditions of a start-stop vehicle. For example, the electric pump motor may be operated in two different modes, a fuel mode (during which the electric pump motor is used to operate the DI fuel pump, and the auxiliary transmission fluid pump is deactivated) and a transmission mode (during which the electric pump motor is used to operate the auxiliary transmission fluid pump, and the DI fuel pump is deactivated). The fuel mode and the transmission mode may include mutually exclusive conditions, for example, as will be elaborated below. In particular, operating the electric pump motor in the transmission mode enables the auxiliary transmission fluid pump to maintain a functional, hydraulically controlled transmission while the engine is not turning. This condition does not occur while the engine consumes fuel, enabling the same electric pump motor to operate in the fuel mode to pump high pressure fuel via the DI fuel pump when the auxiliary transmission fluid pump is not in use. Instructions for carrying out method 500 may be executed by a controller (e.g., controller 12 of FIGS. 1-2) based on instructions stored on a memory of the controller and in conjunction with signals received from sensors of the engine system, such as the sensors described above with reference to FIGS. 1-2. The controller may employ actuators of the engine system to adjust operation according to the methods described below.

At 502, method 500 includes estimating and/or measuring operating conditions. The operating conditions may include, for example, vehicle speed, a state of charge (SOC) of a system battery (e.g., system battery 58 of FIG. 1), engine status (e.g., "on," with combustion occurring in engine cylinders, or "off," with combustion discontinued), vehicle status (e.g., keyed-on or keyed-off), engine load, engine temperature, engine speed, driver-demanded torque, a brake pedal position, a DI fuel rail pressure, a transmission fluid pressure, etc. The operating conditions may be measured or inferred based on available data. As one example, the SOC may be inferred as a percentage charge of a total charge capacity. As another example, the DI fuel rail pressure may be measured with a fuel rail pressure sensor (e.g., fuel rail pressure sensor 248 of FIG. 2), and the transmission fluid pressure may be measured with a transmission fluid pressure sensor (e.g., transmission fluid pressure sensor 48 of FIG. 1). As still another example, the driver-demanded torque may be determined based on an accelerator pedal position (e.g., via pedal position sensor 134 of FIG. 1).

At 504, method 500 includes determining if the engine is auto-stopped. For example, the engine may be auto-stopped when the engine is off while the vehicle remains on. As one example, the controller may configured to automatically shut down the engine while the engine is idling and vehicle is stationary, in what is referred to as a static start-stop (SSS). As another example, the controller may be configured to automatically shut down the engine while the engine is idling and the vehicle is in motion, in what is referred to as a rolling start-stop (RSS). Thus, both the SSS and the RSS result in the engine being off, without combustion occurring in engine cylinders, while the vehicle remains keyed-on.

If the engine is not already auto-stopped, method 500 proceeds to 506 and includes determining if engine auto-stop conditions are met. The engine auto-stop conditions may include, for example, the battery SOC being above a threshold SOC, the vehicle speed being less than a threshold speed, and the driver-demanded torque being less than a threshold torque. For example, the threshold SOC may be a battery charge level below which the battery may not be able to support or execute additional vehicle functions while the engine is off and/or may be unable to restart the engine. As one non-limiting example, the threshold SOC may be 30%. The threshold torque may correspond to a neutral (e.g., undepressed) accelerator pedal position, for example. The threshold speed may vary based on whether the engine auto-stop is requested for a SSS or a RSS. For example, the threshold speed may be lower (e.g., in a range from 1-3 mph) when the engine auto-stop is requested for a SSS and higher (e.g., in a range from 5-10 mph) when the engine shutdown is requested for a RSS. As still another example, the engine shutdown conditions may further include the engine idling for longer than a threshold duration. The threshold duration refers to a non-zero time duration, such as a duration in a range from 1-10 seconds, that may be calibrated to reduce rapid auto-stops and auto-starts due to driver change of mind. All of the engine auto-stop conditions may be satisfied for the engine auto-stop conditions to be considered met, at least in some examples.

If the engine auto-stop conditions are not met, such as when at least one of the engine auto-stop conditions is not met, method 500 proceeds to 508 and includes operating the DI fuel pump to supply fuel to the engine for combustion. Thus, with the engine auto-stop conditions not met, the engine will be maintained on and operating at a non-zero speed, such as by injecting the fuel supplied by the DI fuel pump into the engine cylinders via fuel injectors (e.g., fuel injectors 166 of FIGS. 1-2) and igniting the fuel (e.g., via spark plug 192 of FIG. 1) to produce combustion. Operating the DI fuel pump to supply fuel to the engine for combustion includes operating a fuel lift pump (e.g., LPP 212 of FIG. 2) to supply fuel to the DI fuel pump, as indicated at 510. As elaborated above with respect to FIG. 2, the fuel lift pump may be driven by its own electric motor, and the controller may adjust the fuel lift pump electric motor speed and/or pulse duration in order to provide a desired fuel volume and/or fuel pressure to an inlet of the DI fuel pump.

Operating the DI fuel pump to supply fuel to the engine for combustion further includes energizing an inlet solenoid valve of the DI fuel pump (e.g., inlet solenoid valve 236 shown in FIGS. 2, 3A-3C, and 4A-4C) to supply high pressure fuel to a DI fuel rail (e.g., DI fuel rail 250 shown in FIG. 2), as indicated at 512. In some examples, the inlet solenoid valve may be held in the energized state while operating the DI fuel pump to supply fuel to the engine for combustion, as elaborated above with respect to FIGS. 3A-3C and 4A-4C. In other examples, the controller may selectively energize the inlet solenoid valve of the DI fuel pump in order to adjust a volume and/or pressure of fuel compressed by the DI fuel pump and delivered to the DI fuel rail, as also elaborated above with respect to FIGS. 3A-3C and 4A-4C. In such examples, the controller may determine an actuation timing for energizing the inlet solenoid valve of the DI fuel pump based on relevant operating conditions, such as the DI fuel rail pressure. Further, the controller may receive an indication of a position of a piston of the DI fuel pump via a sensor, such as a cam position sensor. The actuation timing may include, for example, both a desired piston position (or a desired angular position of the cam) for commencing the energizing and a duration of the energizing.

As one example, the controller may determine a desired volume of fuel to compress based on at least the DI fuel rail pressure, such as by inputting the DI fuel rail pressure into a look-up table, algorithm, or map. Then, the controller may input the resulting desired volume of fuel to compress into another look-up table, algorithm, or map, which may output the corresponding actuation timing for compressing the desired volume of fuel. As another example, the controller may make a logical determination (e.g., regarding the actuation timing of the inlet solenoid valve) based on logic rules that are a function of the DI fuel rail pressure. The controller may then generate a control signal that is sent to the inlet solenoid valve of the DI pump at the determined actuation timing.

Operating the DI fuel pump to supply fuel to the engine for combustion additionally includes adjusting the electric pump motor operation based on the DI fuel rail pressure, as indicated at 514. Thus, the electric pump motor may be operated in the fuel mode, with the rotational speed of the pump (and thus, an amount of voltage and/or current supplied to the pump) controlled based on feedback signals received from the fuel system (e.g., measurements received from the fuel rail pressure sensor). As one example, the controller may determine a desired speed for operating the electric pump motor by inputting the fuel rail pressure into a look-up table, algorithm, or map, which may output the corresponding electric pump motor speed for providing the input fuel rail pressure. As another example, the controller may input a difference between a desired fuel rail pressure and the currently measured fuel rail pressure into a look-up table, algorithm, or map, which may output the corresponding electric pump motor speed for increasing the currently measured fuel rail pressure to the desired fuel rail pressure. As still another example, the controller may make a logical determination (e.g., regarding the rotational speed of the electric pump motor) based on logic rules that are a function of the DI fuel rail pressure. The controller may then generate a control signal that is sent to the electric pump motor to supply a corresponding amount of voltage and/or current to rotate the electric pump motor at the determined speed. In general, higher electric pump motor speeds may result in higher DI fuel rail pressures, and lower electric pump motor speeds may result in lower DI fuel rail pressures.

In some examples, the electric pump motor may be operated intermittently (e.g., in a pulsed mode), going from zero to non-zero voltage responsive to a decrease in fuel rail pressure. For example, the electric pump motor may be operated at a non-zero speed to produce one or more full DI fuel pump rotations (e.g., wherein the pump piston goes from TDC to BDC and back to TDC) for a pump pulse and then set to a speed of zero between pump pulses.

At 516, method 500 includes maintaining the auxiliary transmission fluid pump deactivated. For example, the auxiliary transmission fluid pump may be "free-wheeled" as the electric pump motor rotates to drive the DI fuel pump. Maintaining the auxiliary transmission fluid pump deactivated includes maintaining the solenoid-actuated bypass valve de-energized, as indicated at 518. As elaborated above with respect to FIGS. 3A-3B and 4A-4B, with the solenoid-actuated bypass valve de-energized, transmission fluid may flow from an outlet of the auxiliary transmission fluid pump to an inlet of the auxiliary transmission fluid pump via a bypass passage instead of being pumped to the transmission.

At 520, method 500 includes circulating transmission fluid via an engine-driven pump (e.g., engine-driven transmission fluid pump 38 of FIG. 1). The engine-driven pump may be driven by the rotation of the engine during engine running conditions to circulate transmission fluid through an engine-driven pump fluid loop, thereby providing hydraulic pressure in the transmission. Method 500 may then end. As one example, method 500 may return so that operation of the DI fuel pump, the auxiliary transmission fluid pump, and the shared electric pump motor may be adjusted as operating conditions change.

Returning to 506, if instead auto-stop conditions are met, method 500 proceeds to 522 and includes discontinuing the fuel supply and shutting down the engine. For example, the fuel injectors and the spark plugs may be disabled so that combustion does not occur in the engine cylinders. Without combustion occurring in the engine cylinders, the engine may be spun down to rest (e.g., to an engine speed of zero). Further, the fuel lift pump may be deactivated, with a commanded voltage set to zero, for example, so that fuel is not lifted to the inlet of the DI fuel pump. Method 500 may then proceed to 524 to maintain the DI fuel pump deactivated, as will be described below.

Returning to 504, if the engine is already auto-stopped, method 500 proceeds to 524 and includes maintaining the DI fuel pump deactivated. For example, with combustion discontinued and the fuel lift pump deactivated, there is not a demand for supplying high pressure fuel to the DI fuel rail. Maintaining the DI fuel pump deactivated includes maintaining the DI fuel pump inlet solenoid valve de-energized, as indicated at 526. In this way, although rotation of the electric pump motor may continue to reciprocate the pump piston, the DI fuel pump will not perform pumping work, as described above with particular regard to FIGS. 3C and 4C.

At 528, method 500 includes operating the auxiliary transmission fluid pump to circulate the transmission fluid. The auxiliary transmission fluid pump may be driven by the rotation of the electric pump motor to circulate transmission fluid through an auxiliary transmission fluid loop (e.g., auxiliary transmission fluid loop 318 of FIGS. 3A-3C and 4A-4C), thereby providing hydraulic pressure in the transmission while the engine is off and the engine-driven transmission fluid pump is not operating. Operating the auxiliary transmission fluid pump to circulate the transmission fluid includes energizing the auxiliary transmission fluid pump solenoid-actuated bypass valve, as indicated at 530. As elaborated above with respect to FIGS. 3C and 4C, with the solenoid-actuated bypass valve energized, transmission fluid may flow from the transmission to the inlet of the auxiliary transmission fluid pump, through pump chambers of the auxiliary transmission fluid pump to the outlet, and from the outlet of the auxiliary transmission fluid pump to the transmission (and not through the bypass). In this way, the rotation of the auxiliary transmission fluid pump via the rotation of the electric pump motor shaft produces pumping work.

Operating the auxiliary transmission fluid pump to circulate the transmission fluid includes adjusting the pump motor based on the transmission fluid pressure, as indicated at 532. Thus, the electric pump motor may be operated in the transmission mode, with the rotational speed of the pump (and thus, an amount of voltage and/or current supplied to the pump) controlled based on feedback signals received from the transmission system (e.g., measurements received from the transmission fluid pressure sensor). As one example, the controller may determine the desired speed for operating the electric pump motor by inputting the transmission fluid pressure into a look-up table, algorithm, or map, which may output the corresponding electric pump motor speed for maintaining the input transmission fluid pressure. As another example, the controller may input a difference between a desired transmission fluid pressure and the currently measured transmission fluid pressure into a look-up table, algorithm, or map, which may output the corresponding electric pump motor speed for increasing the currently measured transmission fluid pressure to the desired transmission fluid pressure. As still another example, the controller may make a logical determination (e.g., regarding the rotational speed of the electric pump motor) based on logic rules that are a function of the transmission fluid pressure. The controller may then generate a control signal that is sent to the electric pump motor to supply a corresponding amount of voltage and/or current to rotate the electric pump motor at the determined speed. In general, higher electric pump motor speeds may result in higher transmission fluid pressures, and lower electric pump motor speeds may result in lower transmission fluid pressures. Further, the desired transmission fluid pressure may be above a threshold transmission fluid pressure, the threshold transmission fluid pressure corresponding to a minimum pressure for maintaining and/or changing actuator positions within the transmission while the engine is off.

At 534, method 500 includes determining if the fuel rail pressure is greater than a threshold pressure. For example, the fuel rail pressure may slowly decay while the engine is off. The threshold pressure may be a non-zero pressure value at or above which the DI fuel rail may have sufficient pressure for decreased emissions during engine start. Therefore, at pressures below the threshold pressure, the pressure of the DI fuel rail may result in increased emissions.

If the fuel rail pressure is greater than the threshold pressure, method 500 proceeds to 536 and includes determining if engine auto-start conditions are met. That is, if the DI fuel rail still has enough pressure to perform a combustion-assisted start, the engine may remain off until the engine auto-start conditions are met. As one example, the engine auto-start (e.g., restart) conditions may be met when at least one engine auto-stop condition, defined above at 506, is no longer met. For example, while monitoring the vehicle conditions during the auto-stop, the controller may compare the engine auto-stop parameters to their corresponding thresholds to determine if the engine auto-start conditions are met. As such, the engine auto-start conditions may include, for example, the battery SOC dropping below the threshold SOC, the vehicle speed increasing above the threshold speed, and the driver-demanded torque being greater than the threshold torque. As mentioned above, any or all of the engine auto-start conditions may be met for an engine restart to be initiated. As one illustrative example, the battery SOC may be depleted due to the electric pump motor drawing electrical power from the system battery in order to operate the auxiliary transmission fluid pump during the auto-stop, resulting in the battery SOC decreasing below the threshold SOC.

If the engine auto-start conditions are not met, such as when all of the engine auto-stop conditions continue to be met, method 500 may return to 524 to continue maintaining the DI fuel pump deactivated. Without fuel supplied to the engine and without combustion occurring within the engine cylinders, the engine may remain at rest. Further, the auxiliary transmission fluid pump may continue to be operated to circulate the transmission fluid and maintain hydraulic pressure at the transmission. By maintaining the engine shut down when engine auto-start conditions are not met and the fuel rail pressure remains above the threshold pressure, vehicle fuel economy may be increased while emissions are decreased.

If instead the auto-start conditions are met at 536, or if the fuel rail pressure is not greater than the threshold pressure at 534, method 500 proceeds to 538 and includes cranking the engine. For example, the engine may be restarted by cranking the engine to a non-zero speed (e.g., with electric machine 52 of FIG. 1) while fuel is injected into the engine cylinders for a combustion-assisted start. As one example, the engine auto-start may be initiated responsive to the fuel rail pressure decreasing to the threshold pressure so that the restart may be performed, thereby decreasing an engine start time and/or decreasing emissions during the start. As another example, the engine auto-start may be initiated responsive to at least one of the engine auto-start conditions being met. Method 500 may then return to 508 to operate the DI fuel pump to supply fuel to the engine for combustion. For example, the electric pump motor may transition from operating in the transmission mode to operating in the fuel mode, with the electric pump motor speed adjusted in order to provide a desired DI fuel rail pressure. In some examples, transitioning from the transmission mode to the fuel mode may include in a brief overlap period during which the electric motor drives both the auxiliary transmission fluid pump and the DI fuel pump (e.g., the solenoid-actuated bypass valve and the DI fuel pump inlet solenoid valve are simultaneously energized) to ensure that the transmission fluid pressure is maintained while the engine spins up. For example, during the engine restart, the auxiliary transmission fluid pump may be maintained activated until after combustion commences and the engine speed reaches a threshold speed. The threshold speed refers to a non-zero engine speed above which the engine-driven transmission fluid pump is able to maintain transmission fluid pressure (e.g., idle speed). Due to low engine speed at engine start, little hydraulic power may be used by the DI fuel pump, and as such, the electric pump motor may maintain auxiliary transmission fluid pump operation without overloading the electric pump motor. After the overlap period at engine start, the DI fuel pump may continue to be driven by the electric pump motor until the engine is again auto-stopped or the vehicle is keyed off, for example, while the auxiliary transmission fluid pump remains deactivated.

In this way, method 500 of FIG. 5 may include determining an engine-on condition, and in response thereto, operating the electric pump motor to drive the DI fuel pump, energizing the DI fuel pump inlet solenoid valve, and de-energizing the auxiliary transmission fluid pump solenoid-actuated bypass valve; and determining an engine-off condition (which may be an engine auto-stop condition and where the vehicle remains on), and in response thereto, operating the electric pump motor to drive the auxiliary transmission fluid pump, de-energizing the DI fuel pump inlet solenoid valve, and energizing the auxiliary transmission fluid pump solenoid-actuated bypass valve. In some examples, operating the electric pump motor to drive the DI fuel pump occurs while or during the engine-on condition, and operating the electric pump motor to drive the auxiliary fluid pump occurs while the engine-on condition is not present and/or while or during the engine-off condition. Further, instructions stored in memory may include instructions for determining the engine-on condition (e.g., based on an output of an engine speed sensor) and in response, operating the electric pump motor to drive the DI fuel pump by instructions for operating in a fuel mode, performing the energizing the DI fuel pump inlet solenoid valve by instructions for sending an energization signal to the DI fuel pump inlet solenoid valve, and performing the de-energizing the auxiliary transmission fluid pump solenoid-actuated bypass valve by instructions for not sending an energization signal to the auxiliary transmission fluid pump solenoid-actuated bypass valve. Instructions stored in memory may also include instructions for determining the engine-off condition (e.g., based on the output of the engine speed sensor) and in response, operating the electric pump motor to drive the auxiliary transmission fluid pump by instructions for operating in a transmission mode, performing the de-energizing the DI fuel pump inlet solenoid valve by instructions for not sending an energization signal to the DI fuel pump inlet solenoid valve, and performing the energizing the auxiliary transmission fluid pump solenoid-actuated bypass valve by instructions for sending an energization signal to the auxiliary transmission fluid pump solenoid-actuated bypass valve. In some examples, the method may include determining whether to perform one or more of each of energizing the DI fuel pump inlet solenoid valve and energizing the auxiliary transmission fluid pump solenoid-actuated bypass valve based on a determination of whether the engine-on condition is present and a determination of whether the engine-off condition is present.

Next, FIG. 6 shows an example timeline 600 for operating an auxiliary transmission fluid pump (e.g., auxiliary transmission fluid pump 40 of FIGS. 1, 3A-3C and 4A-4C) and a DI fuel pump (e.g., HPP 214 of FIGS. 2, 3A-3C and 4A-4C) using a same electric pump motor (e.g., electric pump motor 42 of FIGS. 1, 3A-3C and 4A-4C). For example, a controller (e.g., controller 12 of FIGS. 1 and 2) may adjust operation of the electric pump motor as well as activate/deactivate the auxiliary transmission fluid pump and the DI fuel pump based on operating conditions according to the example method of FIG. 5.

Electric pump motor speed is shown in plot 602, engine status is shown in plot 604, fuel rail pressure is shown in plot 606, transmission fluid pressure is shown in plot 608, battery SOC is shown in plot 610, DI fuel pump status is shown in plot 612, and auxiliary transmission fluid pump status is shown in plot 614. For all of the above, the horizontal axis represents time, with time increasing along the horizontal axis from left to right. The vertical axis represents each labeled parameter. For plots 602, 608, and 610, a value of the labeled parameter increases along the vertical axis from bottom to top. For plots 604, 612, and 614, the vertical axis shows the labeled parameter status. In the particular example of plot 604, the engine is "on" when combustion is occurring in the engine, and the engine is "off" when combustion is not occurring in the engine but the vehicle remains on (e.g., during an engine auto-stop), as labeled. For plots 612 and 614, the vertical axis represents whether the labeled pump is "activated" (e.g., actively pumping) or "deactivated" (e.g., not performing appreciable pumping work), as labeled. Further, dashed line 616 represents a threshold fuel rail pressure, dashed line 618 represents a threshold transmission fluid pressure, and dashed line 620 represents a threshold battery SOC.

Prior to time t1, the engine is on (plot 604), with fuel delivered to the engine for combustion from a high pressure fuel system via the activated DI fuel pump (plot 612). Specifically, an inlet solenoid valve of the DI fuel pump is energized in order to produce pumping work by the pump. As one example, the inlet solenoid may be continuously energized, while in another example, a timing of the inlet solenoid valve energization may be determined by the controller based on a piston position within the pump in order to pump a desired fuel volume, as further described above with respect to FIGS. 3B, 4B, and 5. Additionally, the electric pump motor speed (plot 602) is adjusted in order to provide a desired fuel rail pressure (plot 606). In the example of timeline 600, the electric pump motor is operated in a pulsed mode, wherein the electric pump motor is briefly operated at a non-zero speed to provide one or more DI fuel pump rotations to maintain the fuel rail pressure and then returned to a speed of zero. However, in other examples, the electric pump motor may be operated at a continuous non-zero speed, with the non-zero speed increased responsive to an increased desired fuel rail pressure and decreased responsive to a decreased desired fuel rail pressure.

While the engine is on, transmission fluid pressure (plot 608) is provided by an engine-driven transmission fluid pump (e.g., engine-driven transmission fluid pump 38), the speed of which varies with the engine speed. Because the transmission fluid is circulated via the engine-driven transmission fluid pump and further due to the electric pump motor being used to drive the DI fuel pump (e.g., operating in a fuel mode), the auxiliary transmission fluid pump is deactivated (plot 614). For example, the auxiliary transmission fluid pump is maintained off (e.g., deactivated) while the engine (and thus the engine-driven transmission fluid pump) is on by maintaining a solenoid-actuated bypass valve, coupled in a bypass passage of the auxiliary transmission fluid pump, de-energized. In this way, the auxiliary pump may continue to rotate as the electric motor pump drives the DI fuel pump, but is "free-wheeled."

At time t1, engine auto-stop conditions are met, and the engine is shut down (plot 604). The engine auto-stop is enabled in part due to the battery SOC (plot 610) being greater than the threshold SOC (dashed line 620), although other engine auto-stop conditions are also met (as described at 506 of FIG. 5). Fuel supply is discontinued to the engine, allowing the engine to spin down to rest. As such, the DI fuel pump is deactivated (plot 612) by de-energizing the inlet solenoid valve. At the same time, the auxiliary transmission fluid pump is activated (plot 614) by energizing the solenoid-actuated bypass valve in order to use the auxiliary transmission fluid pump to circulate the transmission fluid. Further, the electric pump motor speed (plot 602) is adjusted in order to operate the auxiliary transmission fluid pump, such as by increasing the electric pump motor speed responsive to an increased desired transmission fluid pressure and decreasing the electric pump motor speed responsive to a decreased desired transmission fluid pressure. In this way, the DI fuel pump is "free-wheeled" as the electric motor pump drives the auxiliary transmission fluid pump, and the auxiliary transmission fluid pump maintains hydraulic pressure at the transmission for maintaining and/or changing gears while the engine is off. As shown, operating the auxiliary transmission fluid pump while the engine is off maintains the transmission fluid pressure (plot 608) above the threshold transmission fluid pressure (dashed line 618), which corresponds to a minimum pressure for maintaining and/or changing actuator positions within the transmission. Further, operating the operating the auxiliary transmission fluid pump while the engine is off draws power from the battery, decreasing the battery SOC (plot 610).

While the engine is off in the auto-stop, the fuel rail pressure (plot 606) gradually decays. At time t2, the fuel rail pressure (plot 606) reaches the threshold fuel rail pressure (dashed line 616), below which the fuel rail pressure may not be high enough to decrease vehicle emissions during engine start. In response, the engine is restarted (plot 604) so that the engine start can be performed before the fuel rail pressure further decreases. During the engine restart, the engine is cranked via an electric machine (e.g., electric machine 52 of FIG. 1), and the DI fuel pump is activated (plot 612), such as by energizing the inlet solenoid valve. There is a brief overlap period while the auxiliary transmission fluid pump remains activated (plot 614) in order to maintain transmission fluid pressure (plot 608) for an in-gear start while the engine spins up. Then, shortly after time t2, the auxiliary transmission fluid pump is deactivated (plot 614), such as by de-energizing the solenoid-actuated bypass valve. Further, the electric pump motor is transitioned to driving the DI fuel pump. In the example shown, the electric pump motor speed (plot 602) is higher during the engine start in order to quickly raise the fuel rail pressure (plot 608) upon the engine restart while maintaining operation of the auxiliary transmission fluid pump and then decreased in order to maintain the fuel rail pressure and operate in the pulsed mode.

At time t3, the engine auto-stop conditions are again met, and the engine is shut down (plot 604). In response, the DI fuel pump is deactivated (plot 612) by de-energizing the inlet solenoid valve, and the auxiliary transmission fluid pump is activated (plot 614) by energizing the solenoid-actuated bypass valve. Further, the electric pump motor is transitioned to driving the auxiliary transmission fluid pump by adjusting the electric pump motor speed (plot 602) based on the transmission fluid pressure. However, driving the auxiliary transmission fluid pump via the electric pump motor draws electric power from the system battery, and the battery SOC decreases (plot 610).

At time t4, the battery SOC (plot 610) reaches the threshold SOC (dashed line 620). In response, the engine auto-stop conditions are no longer met, and the engine is restarted (plot 604). The inlet solenoid valve is energized to activate the DI fuel pump (plot 612), and after the engine spins up and combustion commences, the solenoid-actuated bypass valve is de-energized to deactivate the auxiliary transmission fluid pump (plot 614). Further, the electric pump motor is again transitioned to driving the DI fuel pump (e.g., transitioned to operating in the fuel mode). As the vehicle is driven, the battery SOC increases (plot 610) due to operating the electric machine in a regeneration mode, for example.

In this way, a single electric pump motor may drive both the DI fuel pump and the auxiliary transmission fluid pump, enabling fast engine start times (and combustion-assisted starts) through electrifying the DI fuel pump without including an additional electric motor for driving the DI fuel pump. As a result, vehicle costs may be decreased. Additionally, the electrified DI fuel pump is not subject to engine torque disturbances, which may affect a control of an inlet solenoid valve, as the DI fuel pump may be operated at any speed by adjusting a speed of the shared electric pump motor. By driving the auxiliary transmission fluid pump and the DI fuel pump via the same electric motor during non-overlapping operating conditions, vehicle fuel economy may be increased and vehicle emissions decreased by enabling engine auto-stops (e.g., by operating the auxiliary transmission fluid pump) while customer satisfaction may be increased by decreasing engine start times (e.g., by operating the DI fuel pump).

The technical effect of driving an auxiliary transmission fluid pump and a high pressure fuel pump with a same pump motor is that a fuel rail may be pressurized even when the engine speed is low or zero while vehicle costs may be decreased compared with driving the auxiliary transmission fluid pump and the direct injection fuel pump with separate pump motors.

As one example, a method, comprises: during an engine-on condition of an engine of a vehicle, operating an electric motor to drive a direct injection fuel pump to supply fuel to a direct injection fuel rail; and during an engine-off condition of the engine while the vehicle remains on, operating the electric motor to drive an auxiliary transmission fluid pump to circulate transmission fluid to a transmission rotationally coupled to the engine. In the preceding example, the method additionally or optionally further comprises restarting the engine responsive to the fuel rail pressure decreasing to a threshold pressure during the engine-off condition. In one or both of the preceding examples, the method additionally or optionally further comprises during the engine-on condition, maintaining a solenoid-actuated bypass valve de-energized, the solenoid-actuated bypass valve coupled to an inlet of the auxiliary transmission fluid pump; and during the engine-off condition, maintaining the solenoid-actuated bypass valve energized. In any or all of the preceding examples, additionally or optionally, maintaining the solenoid-actuated bypass valve de-energized maintains closed a first flow passage of the transmission fluid, the first flow passage fluidically coupling the transmission to the inlet of the auxiliary transmission fluid pump, and maintains open a second flow passage of the transmission fluid, the second flow passage including a bypass passage fluidically coupling an outlet of the auxiliary transmission fluid pump to the inlet of the auxiliary transmission fluid pump, and wherein maintaining the solenoid-actuated bypass valve energized maintains closed the second flow passage of the transmission fluid and maintains open the first flow passage of the transmission fluid. In any or all of the preceding examples, the method additionally or optionally further comprises during the engine-on condition, energizing an inlet solenoid valve, the inlet solenoid coupled to an inlet of the direct injection fuel pump; and during the engine-off condition, maintaining the inlet solenoid de-energized. In any or all of the preceding examples, additionally or optionally, energizing the inlet solenoid valve includes maintaining the inlet solenoid valve energized during the engine-on condition. In any or all of the preceding examples, additionally or optionally, energizing the inlet solenoid valve includes energizing the inlet solenoid valve at a selected timing and a selected duration during the engine-on condition, the selected timing and the selected duration at least partially determined based on a pressure of the direct injection fuel rail. In any or all of the preceding examples, additionally or optionally, the direct injection fuel pump and the auxiliary transmission fluid pump are each mechanically coupled to a same shaft of the electric motor. In any or all of the preceding examples, additionally or optionally, the auxiliary transmission fluid pump is coupled to a first shaft of the electric motor, the first shaft coupled to a first motor end of the electric motor, and the direct injection fuel pump is coupled to a second shaft of the electric motor, the second shaft coupled to a second motor end of the electric motor. In any or all of the preceding examples, additionally or optionally, operating the electric motor to drive the direct injection fuel pump to supply fuel to the direct injection fuel rail includes adjusting a rotational speed of the electric motor based on a pressure of the direct injection fuel rail, and operating the electric motor to drive the auxiliary transmission fluid pump to circulate transmission fluid to the transmission rotationally coupled to the engine includes adjusting the rotational speed of the electric motor based on a pressure of the transmission fluid. In any or all of the preceding examples, additionally or optionally, the engine-off condition includes one of a static start-stop and a rolling start-stop.

As another example, a method comprises: adjusting operation of an electric motor mechanically coupled to each of an auxiliary transmission fluid pump and a high pressure fuel pump based on whether an engine is on or auto-stopped; deactivating the auxiliary transmission fluid pump while the engine is on by de-energizing a first solenoid-actuated valve coupled to an inlet of the auxiliary transmission fluid pump; and deactivating the high pressure fuel pump while the engine is auto-stopped by de-energizing a second solenoid-actuated valve coupled to an inlet of the high pressure fuel pump. In the preceding example, the method additionally or optionally further comprises activating the auxiliary transmission fluid pump while the engine is auto-stopped by energizing the first solenoid-actuated valve; and activating the high pressure fuel pump while the engine is on by energizing the second solenoid-actuated valve. In one or both of the preceding examples, additionally or optionally, the first solenoid-actuated valve, when de-energized, enables transmission fluid to flow from an outlet of the auxiliary transmission fluid pump to the inlet of the auxiliary transmission fluid pump via a bypass passage and blocks the transmission fluid from flowing from a transmission to the inlet of the auxiliary transmission fluid pump and, when energized, enables the transmission fluid to flow from the transmission to the inlet of the auxiliary transmission fluid pump and blocks the transmission fluid from flowing through the bypass passage. In any or all of the preceding examples, additionally or optionally, the second solenoid-actuated valve, when de-energized, prevents a compression of fuel within a compression chamber of the high pressure fuel pump and, when energized, enables the compression of fuel within the compression chamber of the high pressure fuel pump. In any or all of the preceding examples, additionally or optionally, adjusting operation of the electric motor mechanically coupled to each of the auxiliary transmission fluid pump and the high pressure fuel pump based on whether the engine is on or auto-stopped includes: adjusting a speed of the electric motor based on a pressure of a fuel rail fluidically coupled downstream of the high pressure fuel pump while the engine is on; and adjusting the speed of the electric motor based on a transmission fluid pressure at a transmission fluidically coupled to the auxiliary transmission fluid pump while the engine is auto-stopped.

As another example, a system comprises: an engine configured to receive fuel from a fuel system, the fuel system including a high pressure fuel pump and a fuel rail; a transmission including an engine-driven fluid pump and an auxiliary transmission fluid pump, the engine-driven fluid pump and the auxiliary fluid pump each configured to circulate transmission fluid; an electric motor rotationally coupled to the high pressure fuel pump and the auxiliary transmission fluid pump; and a controller storing executable instructions in non-transitory memory that, when executed, cause the controller to: shut down the engine responsive to auto-stop conditions being met, including deactivating the high pressure fuel pump, activating the auxiliary transmission fluid pump, and operating the electric motor in a transmission mode; and restart the engine responsive to auto-start conditions being met, including activating the high pressure fuel pump, operating the electric motor in a fuel mode, and deactivating the auxiliary transmission fluid pump responsive to a speed of the engine reaching a threshold speed. In the preceding example, the system additionally or optionally further comprises an auxiliary transmission fluid loop coupled between the auxiliary transmission fluid pump and the transmission, the auxiliary transmission fluid loop including an inlet passage coupled to an inlet of the auxiliary transmission fluid pump, an outlet passage coupled to an outlet of the auxiliary transmission fluid pump, and a bypass passage coupled between the inlet passage and the outlet passage, the bypass passage including a solenoid-actuated bypass valve disposed therein and configured to open the bypass passage when de-energized; and a solenoid-actuated inlet valve coupled to an inlet of the high pressure fuel pump, the solenoid-actuated inlet valve configured to hold open an inlet check valve when de-energized. In one or both of the preceding examples, additionally or optionally, activating the auxiliary transmission fluid pump includes energizing the solenoid-actuated bypass valve; deactivating the auxiliary transmission fluid pump includes de-energizing the solenoid-actuated bypass valve; activating the high pressure fuel pump includes energizing the solenoid-actuated valve; and deactivating the high pressure fuel pump includes de-energizing the solenoid-actuated valve. In any or all of the preceding examples, the system additionally or optionally further comprises a transmission fluid pressure sensor coupled to the transmission and a fuel rail pressure sensor coupled to the fuel rail, and operating the electric motor in the transmission mode includes adjusting a speed of the electric motor based on measurements received from the transmission fluid pressure sensor, and operating the electric motor in the fuel mode includes adjusting the speed of the electric motor based on measurements received from the fuel rail pressure sensor.

In another representation, a method comprises: operating an electric motor in a fuel mode during an engine running condition, including rotating the electric motor in a first direction to engage a first one-way clutch coupled on a first motor shaft between a rotor of the electric motor and a direct injection fuel pump; and operating the electric motor in a transmission mode during an engine auto-stop, including rotating the electric motor in a second direction to engage a second one-way clutch coupled on a second motor shaft between the rotor and an auxiliary transmission fluid pump. In the previous example, additionally or optionally, operating the electric motor in the fuel mode includes operating the electric motor in a pulsed mode. In one or both of the previous examples, additionally or optionally, the pulsed mode includes rotating the electric motor in the first direction at a non-zero speed to complete a full rotation of the direct injection fuel pump and then decreasing the electric motor speed to zero. In any or all of the preceding examples, additionally or optionally, rotating the electric motor in the first direction at the non-zero speed to complete the full rotation of the direct injection fuel pump is responsive to direct injection fuel rail pressure. In any or all of the preceding examples, additionally or optionally, operating the electric motor in the transmission mode includes rotating the electric motor in the second direction at a non-zero speed, the non-zero speed adjusted responsive to transmission fluid pressure. In any or all of the preceding examples, additionally or optionally, the first shaft is coupled to a first motor end of the electric motor, and the second shaft is coupled to a second motor end of the electric motor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during an engine-on condition of an engine of a vehicle, operating an electric motor to drive a direct injection fuel pump to supply fuel to a direct injection fuel rail and operating a motor/generator coupled to the engine; and
   during an engine-off condition of the engine while the vehicle remains on, operating the electric motor to drive an auxiliary transmission fluid pump to circulate transmission fluid to a transmission rotationally coupled to the engine.

2. The method of claim 1, further comprising:
   restarting the engine responsive to a fuel rail pressure decreasing to a threshold pressure during the engine-off condition.

3. The method of claim 1, further comprising:
   during the engine-on condition, maintaining a solenoid-actuated bypass valve de-energized, the solenoid-actuated bypass valve coupled to an inlet of the auxiliary transmission fluid pump; and
   during the engine-off condition, maintaining the solenoid-actuated bypass valve energized.

4. The method of claim 3, wherein maintaining the solenoid-actuated bypass valve de-energized maintains closed a first flow passage of the transmission fluid, the first flow passage fluidically coupling the transmission to the inlet of the auxiliary transmission fluid pump, and maintains open a second flow passage of the transmission fluid, the second flow passage including a bypass passage fluidically coupling an outlet of the auxiliary transmission fluid pump to the inlet of the auxiliary transmission fluid pump, and wherein maintaining the solenoid-actuated bypass valve energized maintains closed the second flow passage of the transmission fluid and maintains open the first flow passage of the transmission fluid.

5. The method of claim 1, further comprising:
   during the engine-on condition, energizing an inlet solenoid valve, the inlet solenoid coupled to an inlet of the direct injection fuel pump; and
   during the engine-off condition, maintaining the inlet solenoid de-energized.

6. The method of claim 5, wherein energizing the inlet solenoid valve includes maintaining the inlet solenoid valve energized during the engine-on condition.

7. The method of claim 5, wherein energizing the inlet solenoid valve includes energizing the inlet solenoid valve at a selected timing and a selected duration during the engine-on condition, the selected timing and the selected duration at least partially determined based on a pressure of the direct injection fuel rail.

8. The method of claim 1, wherein the direct injection fuel pump and the auxiliary transmission fluid pump are each mechanically coupled to a same shaft of the electric motor.

9. The method of claim 1, wherein the auxiliary transmission fluid pump is coupled to a first shaft of the electric motor, the first shaft coupled to a first motor end of the electric motor, and the direct injection fuel pump is coupled to a second shaft of the electric motor, the second shaft coupled to a second motor end of the electric motor.

10. The method of claim 1, wherein operating the electric motor to drive the direct injection fuel pump to supply fuel to the direct injection fuel rail includes adjusting a rotational speed of the electric motor based on a pressure of the direct injection fuel rail, and operating the electric motor to drive the auxiliary transmission fluid pump to circulate transmission fluid to the transmission rotationally coupled to the engine includes adjusting the rotational speed of the electric motor based on a pressure of the transmission fluid.

11. The method of claim 1, wherein the engine-off condition includes one of a static start-stop and a rolling start-stop.

12. A method for a vehicle, comprising:
   adjusting operation of an electric motor mechanically coupled to each of an auxiliary transmission fluid pump and a high pressure fuel pump based on whether an engine is on or auto-stopped;
   deactivating the auxiliary transmission fluid pump while the engine is on by de-energizing a first solenoid-actuated valve coupled to an inlet of the auxiliary transmission fluid pump; and
   deactivating the high pressure fuel pump while the engine is auto-stopped by de-energizing a second solenoid-actuated valve coupled to an inlet of the high pressure fuel pump, wherein the engine is cranked via a motor/generator different than the electric motor.

13. The method of claim 12, further comprising:
   activating the auxiliary transmission fluid pump while the engine is auto-stopped by energizing the first solenoid-actuated valve; and
   activating the high pressure fuel pump while the engine is on by energizing the second solenoid-actuated valve.

14. The method of claim 13, wherein the first solenoid-actuated valve, when de-energized, enables transmission fluid to flow from an outlet of the auxiliary transmission fluid pump to the inlet of the auxiliary transmission fluid pump via a bypass passage and blocks the transmission fluid from flowing from a transmission to the inlet of the auxiliary transmission fluid pump and, when energized, enables the transmission fluid to flow from the transmission to the inlet of the auxiliary transmission fluid pump and blocks the transmission fluid from flowing through the bypass passage.

15. The method of claim 13, wherein the second solenoid-actuated valve, when de-energized, prevents a compression of fuel within a compression chamber of the high pressure fuel pump and, when energized, enables the compression of fuel within the compression chamber of the high pressure fuel pump.

16. The method of claim 12, wherein adjusting operation of the electric motor mechanically coupled to each of the auxiliary transmission fluid pump and the high pressure fuel pump based on whether the engine is on or auto-stopped includes:

adjusting a speed of the electric motor based on a pressure of a fuel rail fluidically coupled downstream of the high pressure fuel pump while the engine is on; and adjusting the speed of the electric motor based on a transmission fluid pressure at a transmission fluidically coupled to the auxiliary transmission fluid pump while the engine is auto-stopped.

17. A system, comprising:

an engine configured to receive fuel from a fuel system, the fuel system including a high pressure fuel pump and a fuel rail;

a transmission including an engine-driven fluid pump and an auxiliary transmission fluid pump, the engine-driven fluid pump and the auxiliary fluid pump each configured to circulate transmission fluid;

a motor/generator coupled to the engine and configured to provide torque to vehicle wheels and provides electrical power to charge a system battery;

an electric motor rotationally coupled to the high pressure fuel pump and the auxiliary transmission fluid pump; and a controller storing executable instructions in non-transitory memory that, when executed, cause the controller to:

shut down the engine responsive to auto-stop conditions being met, including deactivating the high pressure fuel pump, activating the auxiliary transmission fluid pump, and operating the electric motor in a transmission mode; and restart the engine responsive to auto-start conditions being met, including activating the high pressure fuel pump, operating the electric motor in a fuel mode, and deactivating the auxiliary transmission fluid pump responsive to a speed of the engine reaching a threshold speed.

18. The system of claim 17, further comprising:

an auxiliary transmission fluid loop coupled between the auxiliary transmission fluid pump and the transmission, the auxiliary transmission fluid loop including an inlet passage coupled to an inlet of the auxiliary transmission fluid pump, an outlet passage coupled to an outlet of the auxiliary transmission fluid pump, and a bypass passage coupled between the inlet passage and the outlet passage, the bypass passage including a solenoid-actuated bypass valve disposed therein and configured to open the bypass passage when de-energized; and a solenoid-actuated inlet valve coupled to an inlet of the high pressure fuel pump, the solenoid-actuated inlet valve configured to hold open an inlet check valve when de-energized.

19. The system of claim 18, wherein:

activating the auxiliary transmission fluid pump includes energizing the solenoid-actuated bypass valve;

deactivating the auxiliary transmission fluid pump includes de-energizing the solenoid-actuated bypass valve;

activating the high pressure fuel pump includes energizing the solenoid-actuated valve; and deactivating the high pressure fuel pump includes de-energizing the solenoid-actuated valve.

20. The system of claim 17, further comprising a transmission fluid pressure sensor coupled to the transmission and a fuel rail pressure sensor coupled to the fuel rail, and wherein operating the electric motor in the transmission mode includes adjusting a speed of the electric motor based on measurements received from the transmission fluid pressure sensor, and operating the electric motor in the fuel mode includes adjusting the speed of the electric motor based on measurements received from the fuel rail pressure sensor.

* * * * *